US012634042B2

(12) United States Patent
Jung et al.

(10) Patent No.: US 12,634,042 B2
(45) **Date of Patent: *May 19, 2026**

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Byounghoon Jung, Suwon-si (KR); Sangkyu Baek, Suwon-si (KR); Soenghun Kim, Suwon-si (KR); Donggun Kim, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

This patent is subject to a terminal disclaimer.

(21) Appl. No.: 18/308,252

(22) Filed: Apr. 27, 2023

(65) Prior Publication Data

US 2023/0269030 A1 Aug. 24, 2023

Related U.S. Application Data

(63) Continuation of application No. 16/440,333, filed on Jun. 13, 2019, now Pat. No. 11,652,575.

(30) Foreign Application Priority Data

Jun. 21, 2018 (KR) ........................ 10-2018-0071617

(51) Int. Cl.
H04L 1/08 (2006.01)
H04W 24/02 (2009.01)
H04W 28/04 (2009.01)

(52) U.S. Cl.
CPC ............... *H04L 1/08* (2013.01); *H04W 24/02* (2013.01); *H04W 28/04* (2013.01)

(58) Field of Classification Search
None
See application file for complete search history.

(56) References Cited

U.S. PATENT DOCUMENTS 9,832,762 B2 11/2017 Uemura et al.
10,484,912 B2 11/2019 Ahluwalia
(Continued)

FOREIGN PATENT DOCUMENTS

CN 102223730 A 10/2011
CN 105122863 A 12/2015
(Continued)

OTHER PUBLICATIONS

Chinese Office Action with English translation dated Mar. 29, 2024; Chinese Appln. No. 201980050239.0.

(Continued)

*Primary Examiner* — Rebecca E Song
*Assistant Examiner* — Mohammed Niamul Huda Khan
(74) *Attorney, Agent, or Firm* — Jefferson IP Law, LLP

(57) ABSTRACT

A method of operating a terminal in a wireless communication system is provided. The method includes obtaining, from a radio link control (RLC) entity associated with a cell group of the terminal, information about a number of retransmissions of a packet, identifying whether packet duplication is activated, based on information indicating that the number of retransmissions of the packet reaches a maximum number of retransmissions of the packet, and transmitting, to a base station, a message indicating a failure of retransmission of the packet, based on a result of the identifying.

11 Claims, 23 Drawing Sheets

(56) References Cited

U.S. PATENT DOCUMENTS

| | | | | |
|---|---|---|---|---|
| 2012/0057560 | A1 | 3/2012 | Park et al. | |
| 2014/0050113 | A1 | 2/2014 | Rosa et al. | |
| 2015/0181479 | A1 | 6/2015 | Lin et al. | |
| 2016/0262066 | A1 | 9/2016 | Ozturk et al. | |
| 2016/0262118 | A1 | 9/2016 | Kim et al. | |
| 2017/0188392 | A1 | 6/2017 | Uchino et al. | |
| 2018/0270131 | A1 | 9/2018 | Kato et al. | |
| 2018/0279145 | A1 | 9/2018 | Jung et al. | |
| 2018/0310202 | A1* | 10/2018 | Löhr | H04W 76/27 |
| 2018/0368132 | A1* | 12/2018 | Babaei | H04W 76/11 |
| 2019/0141777 | A1 | 5/2019 | Kim et al. | |
| 2020/0107392 | A1 | 4/2020 | Yi et al. | |
| 2020/0120522 | A1* | 4/2020 | Xiao | H04W 36/00692 |
| 2020/0145146 | A1 | 5/2020 | Decarreau et al. | |
| 2020/0177316 | A1* | 6/2020 | Tang | H04L 1/1816 |
| 2020/0235869 | A1 | 7/2020 | Pradas et al. | |
| 2022/0312317 | A1 | 9/2022 | Kim et al. | |

FOREIGN PATENT DOCUMENTS

| | | | | |
|---|---|---|---|---|
| CN | 105637920 | A | 6/2016 | |
| CN | 105814921 | A | 7/2016 | |
| CN | 107211446 | A | 9/2017 | |
| RU | 2486700 | C2 | 6/2013 | |
| WO | WO-2018232701 | A1 * | 12/2018 | H04W 24/00 |

OTHER PUBLICATIONS

Korean Office Action with English translation dated Jul. 19, 2023; Korean Appln. No. 10-2018-0071617.

Chinese Office Action with English translation dated Sep. 1, 2023; Chinese Appln. No. 201980050239.0.

European Search Report dated Jul. 31, 2023; European Appln. No. 19 823 071.6-1215.

Chinese Office Action with English translation dated Jul. 12, 2024; Chinese Appln. No. 201980050239.0.

Chinese Office Action with English translation dated Jan. 15, 2024; Chinese Appln. No. 201980050239.0.

European Notice of Allowance dated Jan. 25, 2024; European Appln. No. 19 823 071.6-1215.

Mediatek Inc: "RLC failure in CA duplication", R2-1710861, 3rd Generation Partnership Project (3GPP), Mobile Competence Centre; 650, Route Des Lucioles; F-06921 Sophia-Antipolis Cedex; France, TSG-RAN WG2 #99bis, Prague, CZ; Oct. 8, 2017 (Oct. 8, 2017), XP051342886, Retrieved from the Internet: www.3gpp.org/ftp/Meetings_3GPP SYNC/RAN2/DOCS/ [retrieved on Oct. 8, 2017].

Russian Office Action dated May 18, 2021, issued in Russian Application No. 2486700.

European Search Report dated Jun. 30, 2021, issued in European Application No. 19823071.6.

European Search Report dated Sep. 1, 2022, issued in European Application No. 19823071.6.

Samsung, RLC Failure Information, R2-1809123, 3GPP TSG-RAN WG2 Meeting #102, Busan, Korea, May 25, 2018 See section 5.3.10.3.

Ericsson, RLC failure for PDCP duplication, R2-1807215, 3GPP TSG-RAN WG2 Meeting #102, Busan, Korea, May 10, 2018 See section 2.1.

Samsung, RLC Max Retransmissions in CA Duplication, R2-1806144, 3GPP TSG-RAN WG2 Meeting #101bis, Sanya, China, Apr. 6, 2018 See section 2.

Vivo, UE behavior upon SCell-failure of PDCP duplication, R2-1804596, 3GPP TSG-RAN WG2 Meeting #101bis, Sanya, China, Apr. 6, 2018 See sections 1-3.

International Search Report dated Sep. 20, 2019, issued in International Patent Application No. PCT/KR2019/007197.

Huawei et al., "Feature lead summary of CSI-RS #2," R1-1807717, 3GPP TSG RAN WG1 #93, 3GPP, Busan, Korea, May 21-25, 2018.

Korean Office Action dated Jan. 20, 2023 issued in Korean Application No. 10-2018-0071617.

European Office Action dated Mar. 14, 2023 issued in European Application No. 19 823 071.6.

* cited by examiner

FIG. 1E

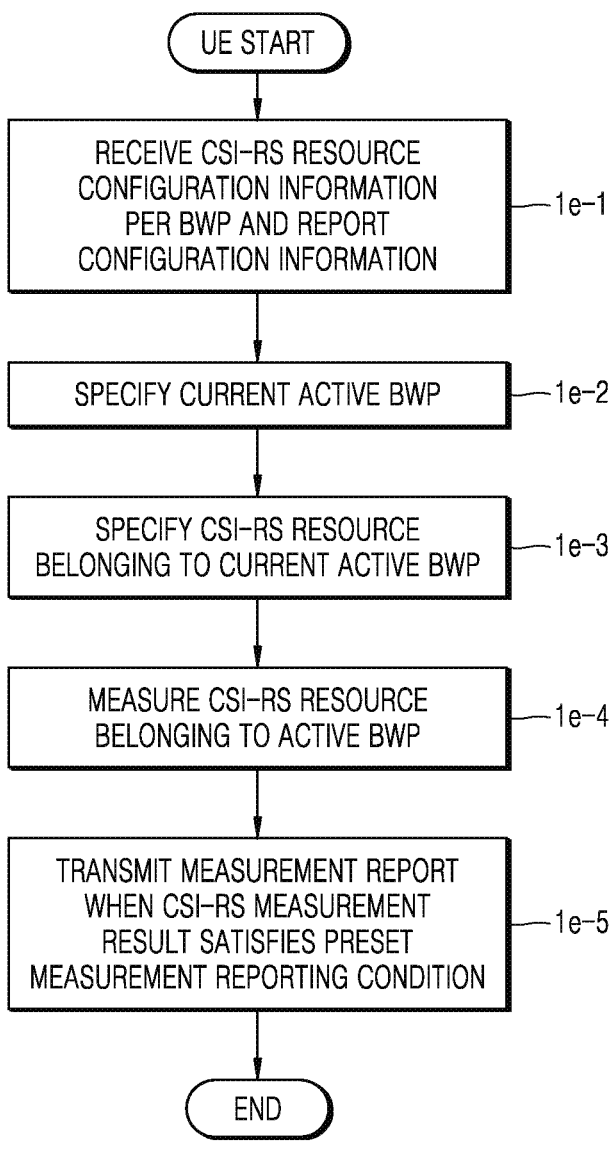

UE START

RECEIVE CSI-RS RESOURCE
CONFIGURATION INFORMATION
PER BWP AND REPORT
CONFIGURATION INFORMATION — 1e-1

SPECIFY CURRENT ACTIVE BWP — 1e-2

SPECIFY CSI-RS RESOURCE
BELONGING TO CURRENT ACTIVE BWP — 1e-3

MEASURE CSI-RS RESOURCE
BELONGING TO ACTIVE BWP — 1e-4

TRANSMIT MEASUREMENT REPORT
WHEN CSI-RS MEASUREMENT
RESULT SATISFIES PRESET
MEASUREMENT REPORTING CONDITION — 1e-5

END

FIG. 1J

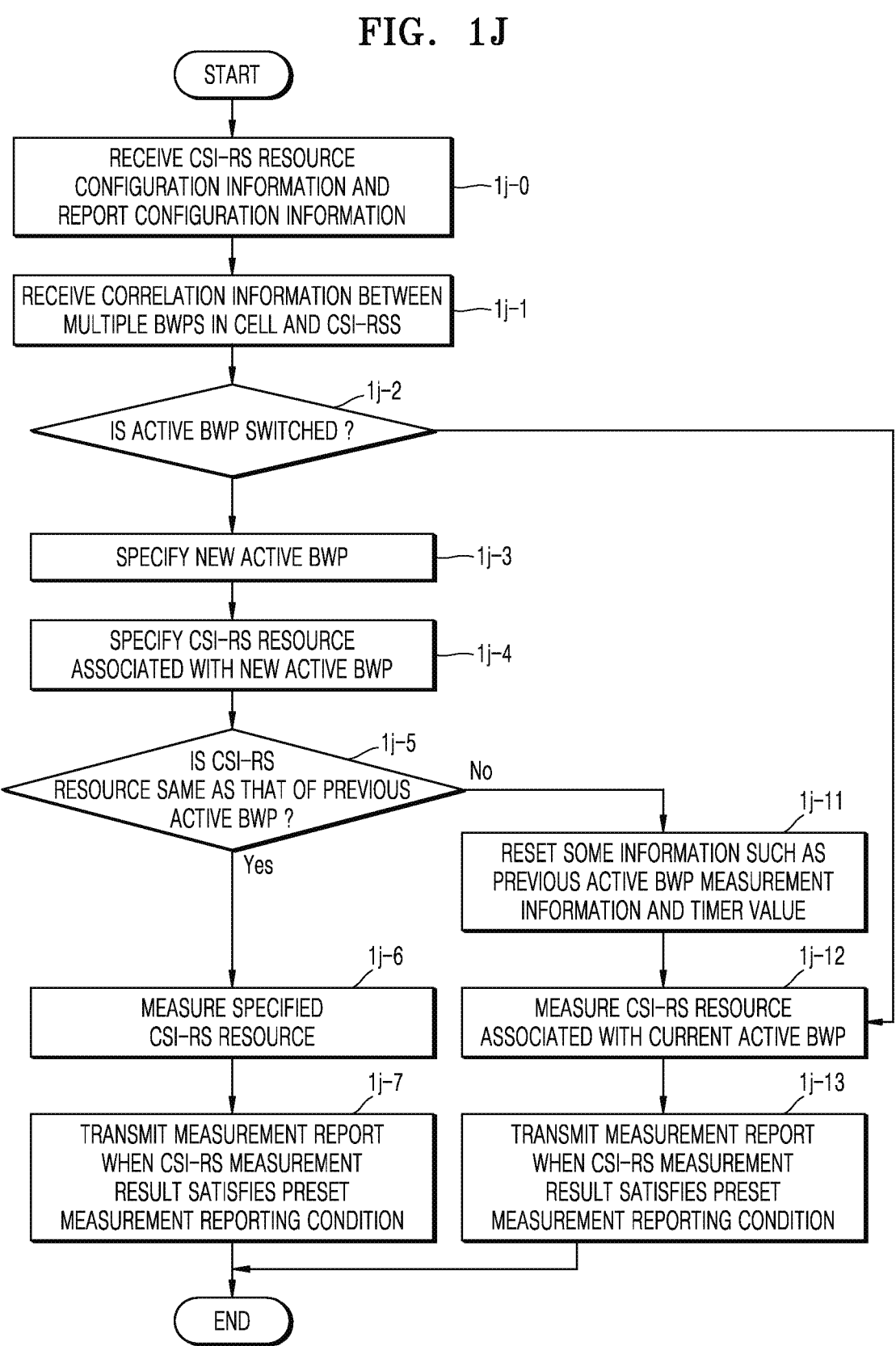

START

RECEIVE CSI-RS RESOURCE CONFIGURATION INFORMATION AND REPORT CONFIGURATION INFORMATION —1j-0

RECEIVE CORRELATION INFORMATION BETWEEN MULTIPLE BWPS IN CELL AND CSI-RSS —1j-1

IS ACTIVE BWP SWITCHED ? —1j-2

SPECIFY NEW ACTIVE BWP —1j-3

SPECIFY CSI-RS RESOURCE ASSOCIATED WITH NEW ACTIVE BWP —1j-4

IS CSI-RS RESOURCE SAME AS THAT OF PREVIOUS ACTIVE BWP ? —1j-5

No

RESET SOME INFORMATION SUCH AS PREVIOUS ACTIVE BWP MEASUREMENT INFORMATION AND TIMER VALUE 1j-11

Yes

MEASURE SPECIFIED CSI-RS RESOURCE 1j-6

MEASURE CSI-RS RESOURCE ASSOCIATED WITH CURRENT ACTIVE BWP 1j-12

TRANSMIT MEASUREMENT REPORT WHEN CSI-RS MEASUREMENT RESULT SATISFIES PRESET MEASUREMENT REPORTING CONDITION 1j-7

TRANSMIT MEASUREMENT REPORT WHEN CSI-RS MEASUREMENT RESULT SATISFIES PRESET MEASUREMENT REPORTING CONDITION 1j-13

END

FIG. 2B

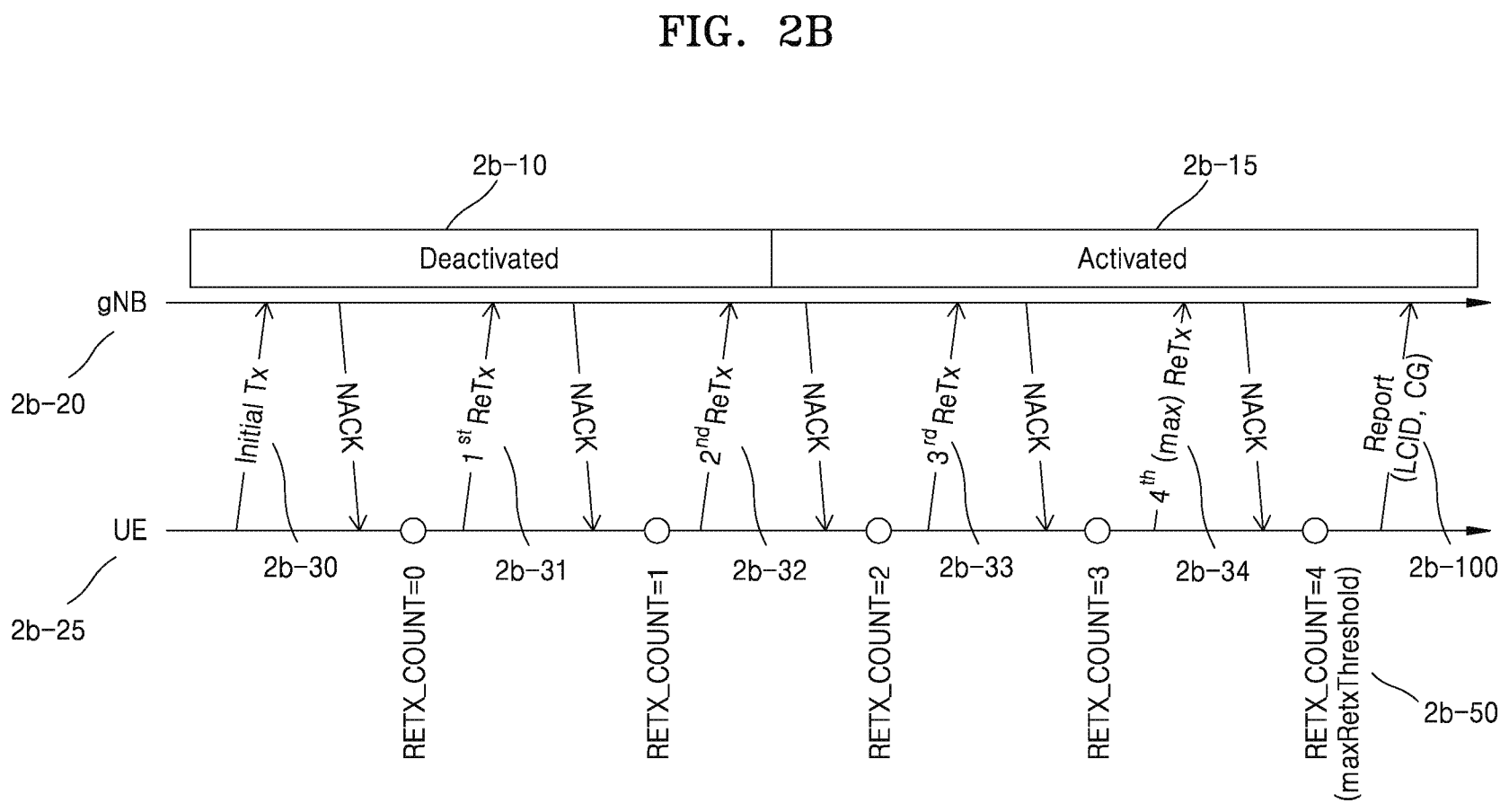

Activated 2b-15

Deactivated 2b-10 gNB 2b-20

UE 2b-25

Report (LCID, CG) 2b-100

(maxRetxThreshold) 2b-50

RETX_COUNT=4

NACK $4^{th}$ (max) ReTx 2b-34

RETX_COUNT=3

NACK $3^{rd}$ ReTx 2b-33

RETX_COUNT=2

NACK $2^{nd}$ ReTx 2b-32

RETX_COUNT=1

NACK $1^{st}$ ReTx 2b-31

RETX_COUNT=0

NACK

Initial Tx 2b-30

FIG. 2G

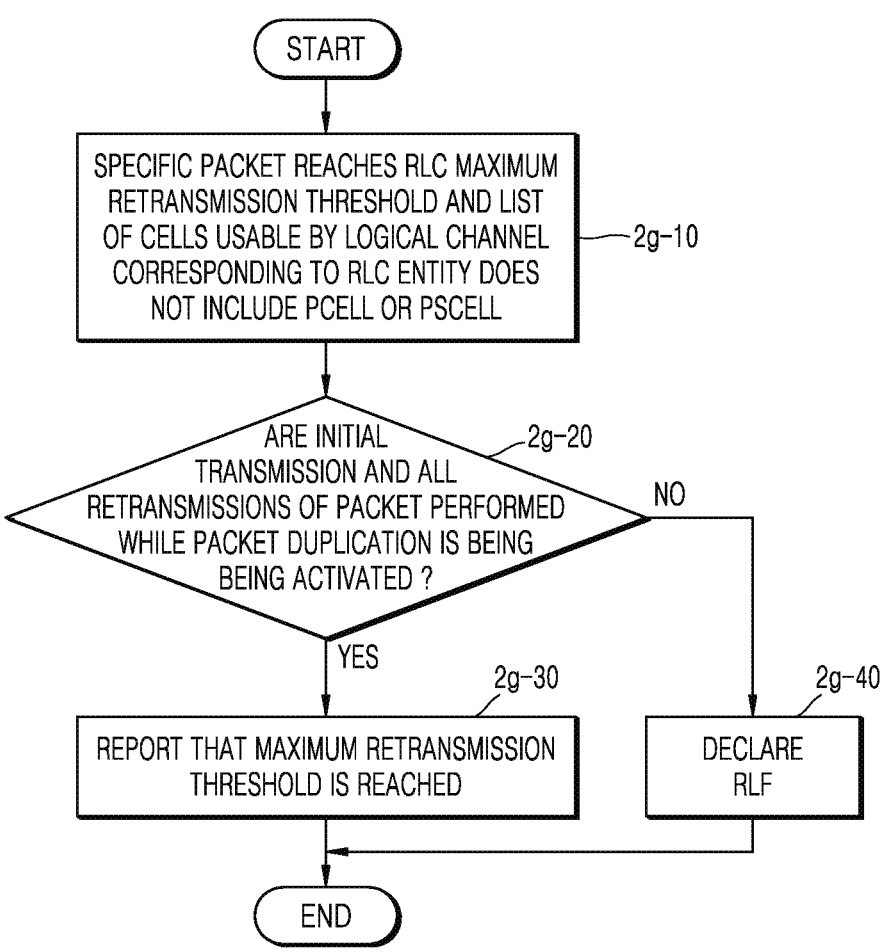

START

SPECIFIC PACKET REACHES RLC MAXIMUM
RETRANSMISSION THRESHOLD AND LIST
OF CELLS USABLE BY LOGICAL CHANNEL
CORRESPONDING TO RLC ENTITY DOES
NOT INCLUDE PCELL OR PSCELL — 2g-10

ARE INITIAL
TRANSMISSION AND ALL — 2g-20
RETRANSMISSIONS OF PACKET PERFORMED
WHILE PACKET DUPLICATION IS BEING
BEING ACTIVATED ?

NO

YES

REPORT THAT MAXIMUM RETRANSMISSION
THRESHOLD IS REACHED — 2g-30

DECLARE
RLF — 2g-40

END

METHOD AND APPARATUS FOR TRANSMITTING AND RECEIVING DATA IN WIRELESS COMMUNICATION SYSTEM

CROSS-REFERENCE TO RELATED APPLICATION(S)

This application is a continuation application of prior application Ser. No. 16/440,333 filed on Jun. 13, 2019, which issued as U.S. Pat. No. 11,652,575 on May 18, 2023, and which is based on and claims priority under 35 U.S.C. § 119(a) of a Korean patent application number 10-2018-0071617 filed on Jun. 21, 2018, in the Korean Intellectual Property Office, the disclosure of which is incorporated by reference herein in its entirety.

BACKGROUND

1. Field

The disclosure relates to a method and apparatus for transmitting and receiving data in a wireless communication system.

2. Description of Related Art

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mm-Wave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, ser-vice interface technology, and security technology are required. In recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing IT and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of Cloud-RAN as the above-described big data processing technology may be an example of convergence of 5G communication technology and IoT technology.

Because various services are providable due to the development of wireless communication systems, methods capable of appropriately providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method of effectively providing services in a mobile communication system.

Additional aspects will be set forth in part in the description which follows and, in part, will be apparent from the description, or may be learned by practice of the presented embodiments.

In accordance with an aspect of the disclosure, a method of operating a terminal in a wireless communication system is provided. The method includes obtaining, from a radio link control (RLC) entity associated with a cell group of the terminal, information about a number of retransmissions of a packet, identifying whether packet duplication is activated, based on information indicating that the number of retransmissions of the packet reaches a maximum number of retransmissions of the packet, and transmitting, to a base station, a message indicating a failure of retransmission of the packet, based on a result of the identifying.

In accordance with another aspect of the disclosure, a terminal in a wireless communication system is provided. The terminal includes a transceiver, and at least one processor configured to obtain, from a RLC entity associated with a cell group of the terminal, information about a number of retransmissions of a packet, identify whether packet duplication is activated, based on information indicating that the number of retransmissions of the packet reaches a maximum number of retransmissions of the packet, and transmit, to a base station, a message indicating a failure of retransmission of the packet, based on a result of the identifying.

In accordance with another aspect of the disclosure, a computer program product is provided. The computer program product includes a non-transitory computer-readable recording medium having recorded thereon a computer-readable program to be executed on a computing device to cause the computing device to obtain, from a RLC entity associated with a cell group of a terminal, information about a number of retransmissions of a packet, identify whether packet duplication is activated, based on information indicating that the number of retransmissions of the packet reaches a maximum number of retransmissions of the packet, and transmit, to a base station, a message indicating a failure of retransmission of the packet, based on a result of the identifying.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1DB is a circuit diagram of a communicator in a wireless communication system according to an embodiment of the disclosure;

FIG. 1DC is a circuit diagram of a communicator in a wireless communication system according to an embodiment of the disclosure;

FIG. 1E is a flowchart of a procedure, performed by a UE, of receiving channel status information-reference signal (CSI-RS) resource configuration information per bandwidth part (BWP) and performing measurement and reporting, according to an embodiment of the disclosure;

FIG. 1GB is a schematic diagram for describing a problem that a CSI-RS resource configuration IE needs to be repeatedly transmitted for BWPs according to an embodiment of the disclosure;

FIG. 1GC is a schematic diagram for describing a problem that a CSI-RS resource configuration IE needs to be repeatedly transmitted for BWPs according to an embodiment of the disclosure;

FIG. 1GD is a schematic diagram for describing a problem that a CSI-RS resource configuration IE needs to be repeatedly transmitted for BWPs according to an embodiment of the disclosure;

FIG. 1J is a flowchart of a procedure in a case in which an active BWP of a UE is switched, according to an embodiment of the disclosure;

FIG. 2B is a schematic diagram for describing a procedure in a case in which a maximum retransmission threshold of a radio link control (RLC) entity is reached in an environment in which packet duplication transmission is configured according to an embodiment of the disclosure;

FIG. 2G is a flowchart of a UE procedure in a case in which a maximum retransmission threshold is reached, according to an embodiment of the disclosure;

Throughout the drawings, like reference numerals will be understood to refer to like parts, components, and structures.

DETAILED DESCRIPTION

Figure 1A:
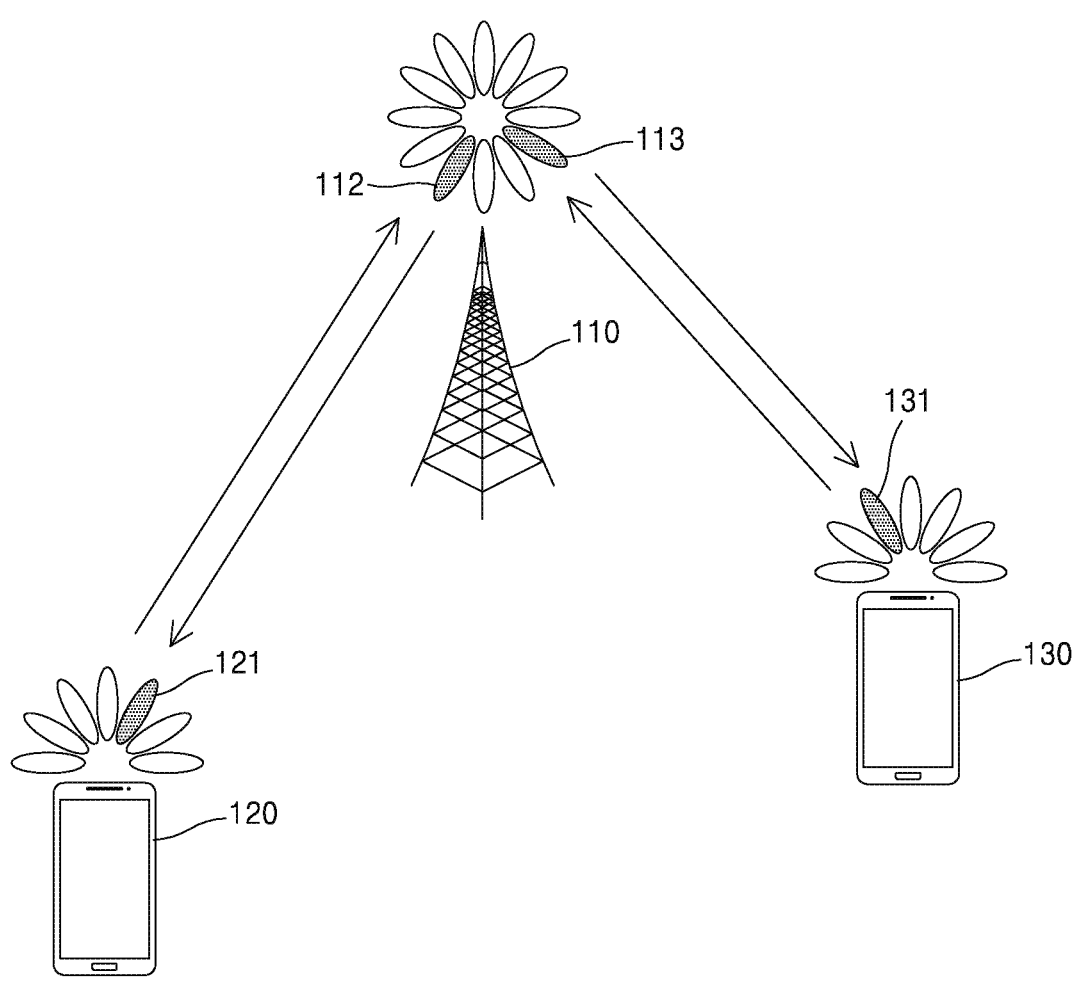
FIG. 1A is a schematic diagram of a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, the "unit" may include at least one processor.

As used herein, a downlink (DL) refers to a transmission path of a wireless signal from a base station to a user equipment (UE), and an uplink (UL) refers to a transmission path of a wireless signal from a UE to a base station. Although the following description may be provided about long term evolution (LTE) or LTE-advanced (LTE-A) systems as an example, the embodiments of the disclosure are also applicable to other communication systems having similar technical backgrounds or channel structures. For example, the embodiments of the disclosure are also applicable to 5th generation (5G) (or new radio (NR)) communication systems developed after LTE-A systems. In the following description, 5G may be understood as a concept including existing LTE and LTE-A, and other similar services. The disclosure is also applicable to other communication systems through modification at the discretion of one of ordinary skill in the art without greatly departing from the scope of the disclosure.

To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed.

In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

In communication systems, a UE requires initial cell selection and cell reselection to select the best accessible base station in an idle mode, and requires radio resource management (RRM) to hand over to a better cell in a connected mode. To select a cell and compare cell performances, each UE should be able to measure or calculate a representative measurement value of each cell or a value derived therefrom. To this end, in existing LTE systems, different base stations reserve orthogonal resources in a shared frequency band using an omni-beam to transmit cell-specific reference signals, and a UE measures the same to find out reference signal received power (RSRP) of each cell.

For next-generation communication systems considering beamforming, research has been conducted on various methods by which different base stations transmit cell- and beam-specific reference signals sequentially at different resources by using different beams, and a UE calculates a representative value corresponding each cell by using measurement values of multiple beams transmitted from the cell.

Although research on reference signal transmission using an omni-beam or reference signal transmission using multiple beams has been already conducted as described above, research has not been conducted on a method by which different base stations transmit two or more types of reference signals generated based on different signal generation rules, by using two or more types of beams having different beam areas, coverages, or transmission cycles.

The disclosure relates to a next-generation wireless communication system, and more particularly, to a system, method, and apparatus for configuring a reference signal for a UE in consideration of different bandwidth parts (BWPs) and for performing cell measurement and reporting by using the configured reference signal, in a beamforming-based system including one or more base stations and one or more UEs.

The disclosure also relates to a reference signal configuration method for beam measurement based on a condition, a reference signal measurement method based on a condition, and a reference signal measurement reporting procedure based on a condition, in a wireless system including a base station and a UE using multiple antennas.

The disclosure provides a system, method, and apparatus for configuring a reference signal for a UE in consideration of different BWPs and for performing cell measurement and reporting by using the configured reference signal, in a beamforming-based system including one or more base stations and one or more UEs.

The disclosure also provides a reference signal configuration method for beam measurement based on a condition, a reference signal measurement method based on a condition, and a reference signal measurement reporting procedure based on a condition, in a wireless system including a base station and a UE using multiple antennas.

A UE may measure reference signals transmitted from base stations by using different antennas based on beam sweeping. The reference signals to be considered include a synchronization signal and a channel status information-reference signal (CSI-RS), but is not limited thereto.

FIG. 1A is a schematic diagram of a wireless communication system according to various embodiments of the disclosure. FIG. 1A illustrates a base station 110, a UE 120, and a UE 130 as some of nodes using wireless channels in the wireless communication system. Although only one base station is illustrated in FIG. 1A, other base stations the same as or similar to the base station 110 may be further included.

The base station 110 is a network infrastructure for providing wireless access to the UEs 120 and 130. The base station 110 may have a coverage defined as a certain geographical region based on a signal transmittable distance. The base station 110 may also be called an 'access point (AP)', an 'evolved NodeB (eNB)', a next-generation NodeB (gNB), a '5$^{th}$ generation (5G) node', a 'wireless point', a 'transmission/reception point (TRP)', or another technically equivalent name.

Each of the UEs 120 and 130 is a device used by a user and may communicate with the base station 110 through a wireless channel. In some cases, at least one of the UE 120 or the UE 130 may operate without manipulation of the user. That is, at least one of the UE 120 or the UE 130 may be a machine type communication (MTC) device not carried by the user. Each of the UEs 120 and 130 may also be called a 'terminal', a 'mobile station', a 'subscriber station', a 'remote terminal', a 'wireless terminal', a 'user device', or another technically equivalent name.

The base station 110 and the UEs 120 and 130 may transmit and receive wireless signals in a millimeter wave (mmWave) band (e.g., 28 GHz, 30 GHz, 38 GHz, or 60 GHz). In this case, to increase channel gain, the base station 110 and the UEs 120 and 130 may perform beamforming. Herein, beamforming may include transmit beamforming and receive beamforming. That is, the base station 110 and the UEs 120 and 130 may give directivity to a transmit signal or a received signal. To this end, the base station 110 and the UEs 120 and 130 may select serving beams 112, 113, 121, and 131 through a beam search procedure or a beam management procedure. After the serving beams 112, 113, 121, and 131 are selected, subsequent communication may be performed using quasi co-located (QCL) resources of resources used to transmit the serving beams 112, 113, 121, and 131.

When large-scale characteristics of a channel used to transmit symbols on a first antenna port may be inferred based on a channel used to transmit symbols on a second antenna port, the first and second antenna ports may be determined as QCL antenna ports. For example, the large-scale characteristics may include at least one of a delay spread, a Doppler spread, a Doppler shift, an average gain, an average delay, or a spatial receiver parameter.

Figure 1B:
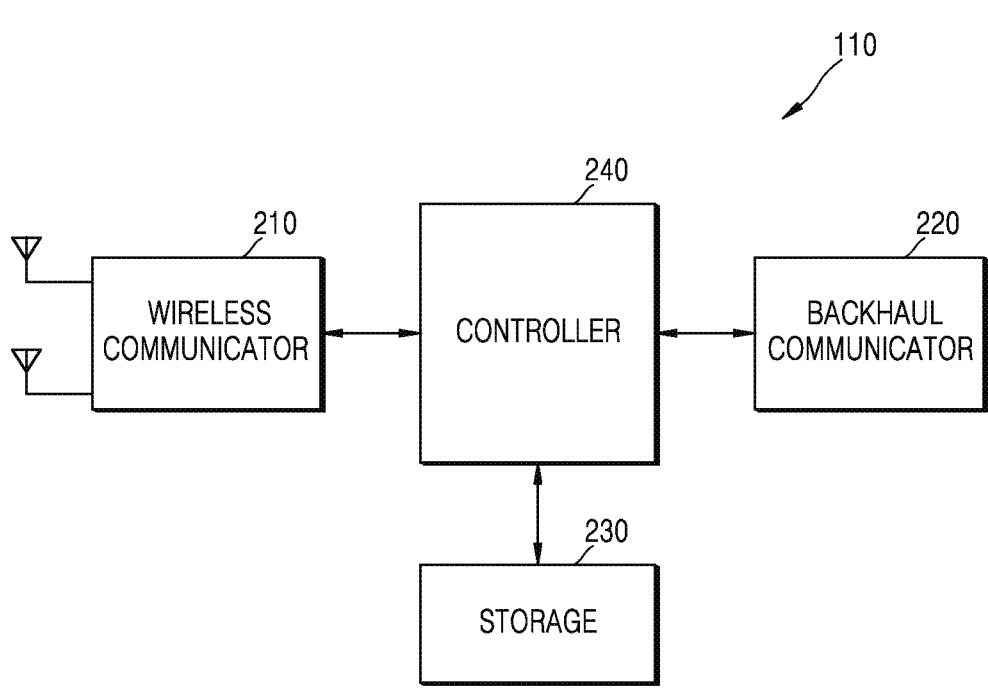
FIG. 1B is a block diagram of a base station in a wireless communication system according to an embodiment of the disclosure.

FIG. 1B is a block diagram of a base station 110 in a wireless communication system according to various embodiments of the disclosure. Elements illustrated in FIG. 1B may be understood as elements of the base station 110. As used herein, a suffix such as ' . . . er' or ' . . . or' indicates a unit for performing at least one function or operation, and may be implemented as hardware, software, or a combination of hardware and software.

Referring to FIG. 1B, the base station 110 may include a wireless communicator 210, a backhaul communicator 220, a storage 230, and a controller 240.

The wireless communicator 210 may perform functions for transmitting and receiving signals through wireless channels. For example, the wireless communicator 210 may convert a baseband signal into a bitstream or vice versa according to physical layer specifications of the system. For example, for data transmission, the wireless communicator 210 may generate complex symbols by encoding and modulating a transmit bitstream. For data reception, the wireless communicator 210 may reconstruct a received bitstream by demodulating and decoding a baseband signal.

The wireless communicator 210 up-converts a baseband signal into a radio frequency (RF) band signal and transmits the RF band signal through an antenna, and down-converts an RF band signal received through an antenna, into a baseband signal. To this end, for example, the wireless communicator 210 may include a transmit filter, a receive filter, an amplifier, a mixer, an oscillator, a digital to analog convertor (DAC), and an analog to digital convertor (ADC). The wireless communicator 210 may include a plurality of transmission/reception paths. Furthermore, the wireless communicator 210 may include at least one antenna array including a plurality of antenna elements.

In terms of hardware, the wireless communicator 210 may include a digital unit and an analog unit, and the analog unit may include a plurality of sub-units based on, for example, operating power or an operating frequency. The digital unit may be implemented as at least one processor (e.g., a digital signal processor (DSP)).

The wireless communicator 210 transmits and receives signals as described above. As such, a part or the entirety of the wireless communicator 210 may be called a 'transmitter', a 'receiver', or a 'transceiver'. In the following description, transmission and reception through wireless channels may include the above-described process performed by the wireless communicator 210.

The backhaul communicator 220 may provide an interface for communicating with another node in a network. That is, the backhaul communicator 220 may convert a bitstream to be transmitted from the base station 110 to another node, e.g., another access node, another base station, an upper node, or a core network, into a physical signal, or convert a physical signal received from another node, into a bitstream.

The storage 230 may store data such as basic programs, application programs, and configuration information for operating the base station 110. The storage 230 may include volatile memory, non-volatile memory, or a combination of volatile memory and non-volatile memory. The storage 230 may provide the stored data upon a request of the controller 240.

The controller 240 may control overall operations of the base station 110. For example, the controller 240 may transmit and receive signals through the wireless communicator 210 or the backhaul communicator 220. The controller 240 write and read data in and from the storage 230. The controller 240 may perform functions of a protocol stack required by communication standards. According to another embodiment of the disclosure, the protocol stack may be included in the wireless communicator 210. To this end, the controller 240 may include at least one processor. According to other embodiments of the disclosure, the controller 240 may control the base station 110 to perform operations described below according to various embodiments of the disclosure.

Figure 1C:
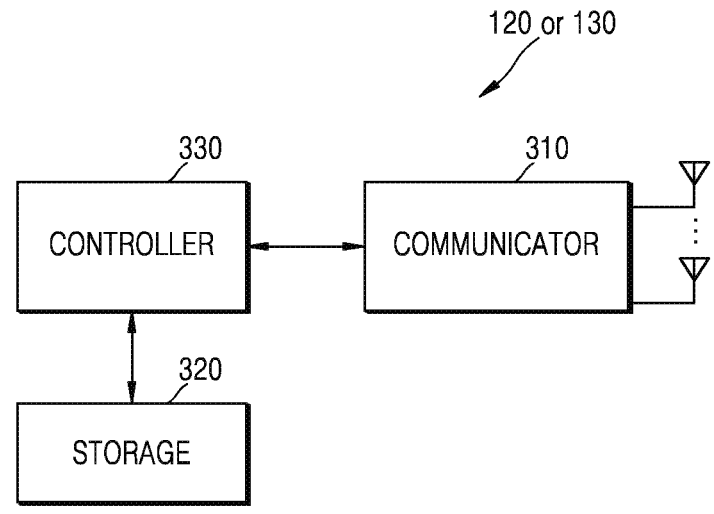
FIG. 1C is a block diagram of a user equipment (UE) in a wireless communication system according to an embodiment of the disclosure.

FIG. 1C is a block diagram of a UE 120 in a wireless communication system according to various embodiments of the disclosure. Elements illustrated in FIG. 1C may be understood as elements of the UE 120. As used herein, a suffix such as ' . . . er' or ' . . . or' indicates a unit for performing at least one function or operation, and may be implemented as hardware, software, or a combination of hardware and software.

Referring to FIG. 1C, the UE 120 may include a communicator 310, a storage 320, and a controller 330.

The communicator 310 may perform functions for transmitting and receiving signals through wireless channels. For example, the communicator 310 may convert a baseband signal into a bitstream or vice versa according to physical layer specifications of the system. For example, for data transmission, the communicator 310 may generate complex symbols by encoding and modulating a transmit bitstream. For data reception, the communicator 310 may reconstruct a received bitstream by demodulating and decoding a baseband signal. The communicator 310 may up-convert a baseband signal into an RF band signal and transmit the RF band signal through an antenna, and down-convert an RF band signal received through an antenna, into a baseband signal. For example, the communicator 310 may include a transmit filter, a receive filter, an amplifier, a mixer, an oscillator, a DAC, and an ADC.

The communicator 310 may include a plurality of transmission/reception paths. Furthermore, the communicator 310 may include at least one antenna array including a plurality of antenna elements. In terms of hardware, the communicator 310 may include a digital unit and an analog unit (e.g., a radio frequency integrated circuit (RFIC)). Herein, the digital circuit and the analog circuit may be implemented as a single package. The communicator 310 may include a plurality of RF chains. Furthermore, the communicator 310 may perform beamforming.

The communicator 310 may transmit and receive signals as described above. As such, a part or the entirety of the communicator 310 may be called a 'transmitter', a 'receiver', or a 'transceiver'. In the following description, transmission and reception through wireless channels may include the above-described process performed by the communicator 310.

The storage 320 may store data such as basic programs, application programs, and configuration information for operating the UE 120. The storage 320 may include volatile memory, non-volatile memory, or a combination of volatile memory and non-volatile memory. The storage 320 may provide the stored data upon a request of the controller 330.

The controller 330 may control overall operations of the UE 120. For example, the controller 330 may transmit and receive signals through the communicator 310. The controller 330 write and read data in and from the storage 320. The controller 330 may perform functions of a protocol stack required by communication standards. To this end, the controller 330 may include at least one processor or microprocessor, or the controller 330 may be a part of the processor. A part of the communicator 310 and the controller 330 may be called a communication processor (CP). According to various embodiments of the disclosure, the controller 330 may control the UE 120 to perform operations described below according to various embodiments of the disclosure.

The controller 330 according to an embodiment of the disclosure may perform a series of operations described below.

The controller 330 according to an embodiment of the disclosure may configure reference signals for the UE 120 in consideration of different frequency bands, and perform cell measurement and reporting by using the configured reference signals.

Figure 1D:
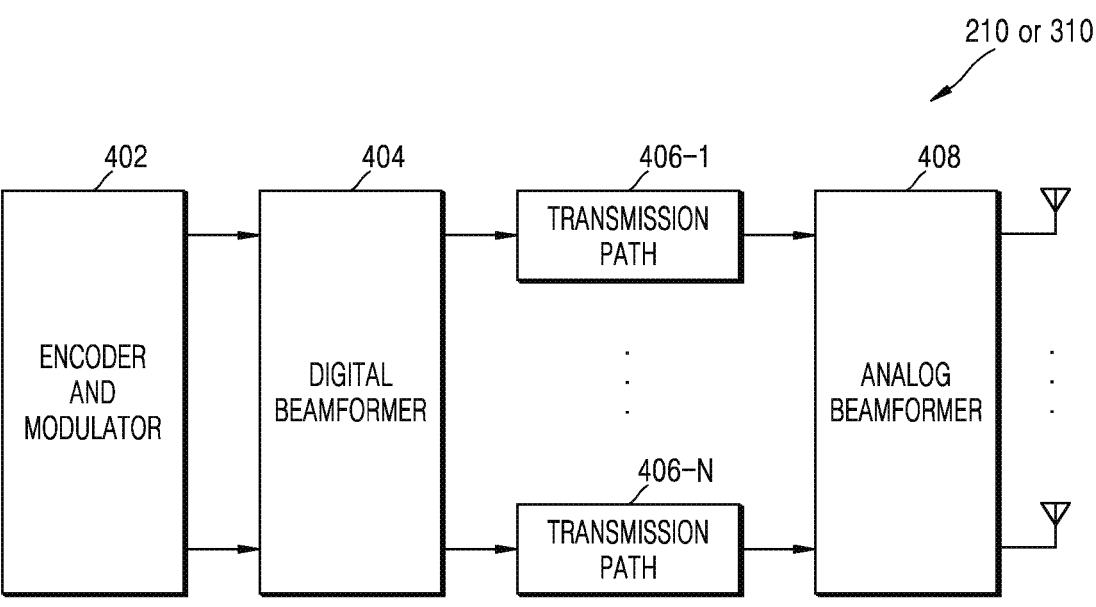
FIG. 1DA is block diagram of a communicator in a wireless communication system according to an embodiment of the disclosure.
Figure 1D:
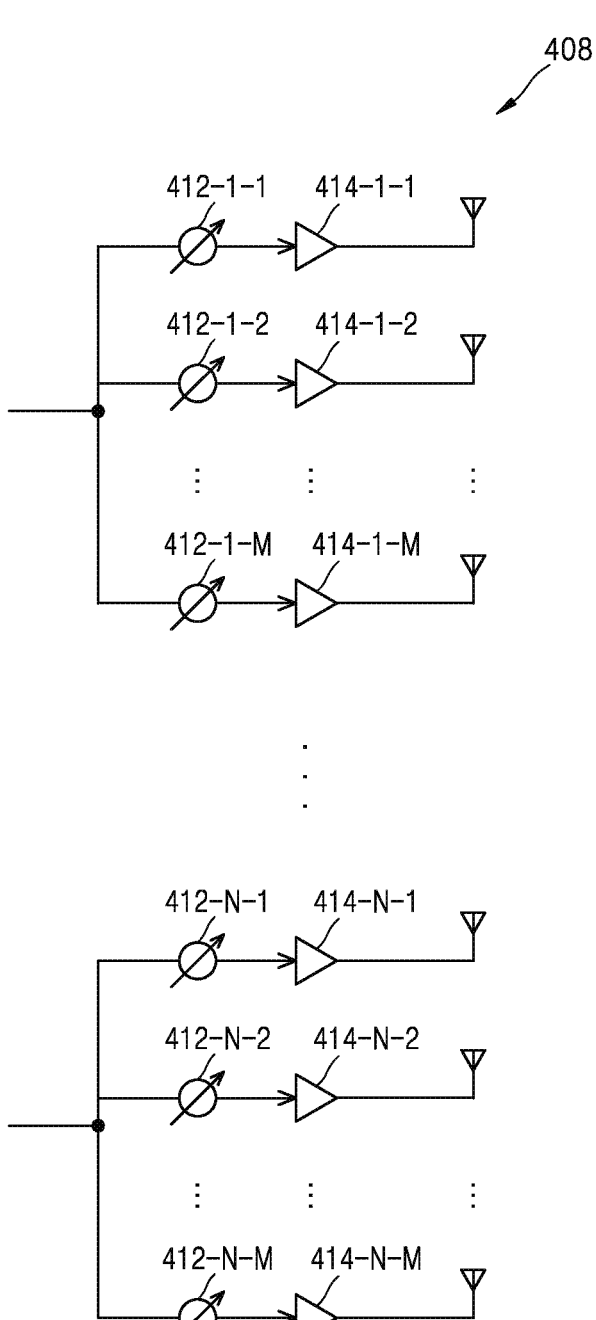
Figure 1D:
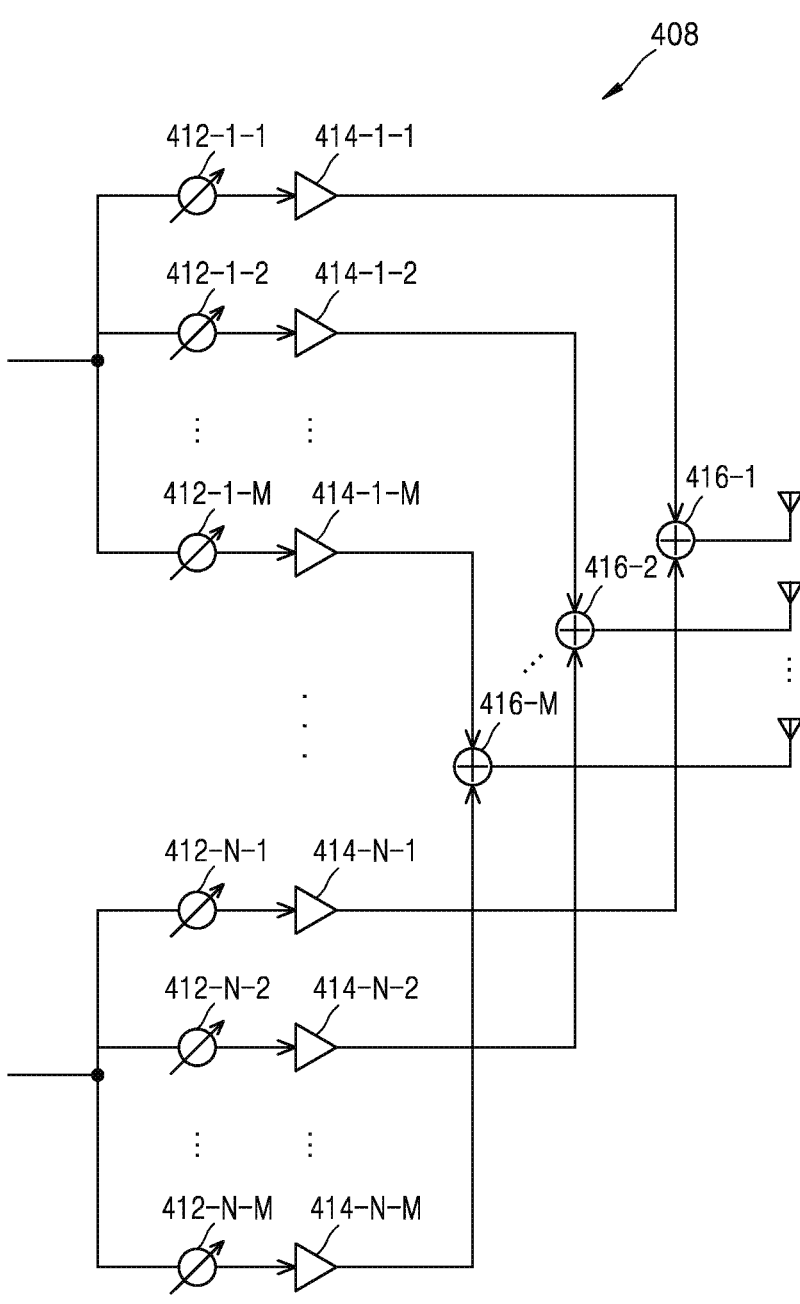

FIGS. 1DA to 1DC are block and circuit diagrams of a communicator in a wireless communication system according to various embodiments of the disclosure. FIGS. 1DA to 1DC illustrate elements of the wireless communicator 210 of FIG. 1B or the communicator 310 of FIG. 1C. Specifically, FIGS. 1DA to 1DC illustrate elements for performing beamforming as a part of the wireless communicator 210 of FIG. 1B or the communicator 310 of FIG. 1C.

FIG. 1DA is a block diagram of a communicator in a wireless communication system according to various embodiments of the disclosure.

Referring to FIG. 1DA, the wireless communicator 210 or the communicator 310 may include an encoder and modulator 402, a digital beamformer 404, a plurality of transmission paths 406-1 to 406-N, and an analog beamformer 408.

The encoder and modulator 402 may perform channel encoding. For channel encoding, at least one of low-density parity-check (LDPC) code, convolution code, or polar code may be used. The encoder and modulator 402 may generate modulated symbols by performing constellation mapping.

The digital beamformer 404 may perform beamforming on digital signals (e.g., the modulated symbols). To this end, the digital beamformer 404 may multiply the modulated symbols by beamforming weights. Herein, the beamforming weights may be used to change intensities and phases of signals and be called, for example, a 'precoding matrix' or a 'precoder'. The digital beamformer 404 may output the digital-beamformed modulated symbols to the plurality of transmission paths 406-1 to 406-N. In this case, based on a multiple-input multiple-output (MIMO) scheme, the modulated symbols may be multiplexed or the same modulated symbols may be provided to the plurality of transmission paths 406-1 to 406-N.

The plurality of transmission paths 406-1 to 406-N may convert the digital-beamformed digital signals into analog signals. To this end, each of the plurality of transmission paths 406-1 to 406-N may include an inverse fast Fourier transform (IFFT) calculator, a cyclic prefix (CP) inserter, a DAC, and an upconverter. The CP inserter is used for an orthogonal frequency division multiplexing (OFDM) scheme and may be omitted for another physical layer scheme (e.g., a FBMC scheme). That is, the plurality of transmission paths 406-1 to 406-N may provide independent signal processes for a plurality of streams generated through digital beamforming. However, depending on implementation, some elements of the plurality of transmission paths 406-1 to 406-N may be shared.

The analog beamformer 408 may perform beamforming on analog signals. To this end, the digital beamformer 404 may multiply the analog signals by beamforming weights. Herein, the beamforming weights may be used to change intensities and phases of signals. Specifically, based on a connection structure between the plurality of transmission paths 406-1 to 406-N and antennas, the analog beamformer 408 may be configured as illustrated in FIG. 1DB or 1DC.

FIG. 1DB is a circuit diagram of a communicator in a wireless communication system according to various embodiments of the disclosure.

Referring to FIG. 1DB, the signals input to the analog beamformer 408 may be converted in phase/intensity, be amplified, and then be transmitted through antennas. In this case, the signals of different paths may be transmitted through different antenna sets, i.e., different antenna arrays. To process the signal input through a first path, the signal may be converted into signal sequences having different or equal phases/intensities by phase/intensity converters 412-1-1 to 412-1-M, be amplified by amplifiers 414-1-1 to 414-1-M, and then be transmitted through antennas. There may be up to N paths. To process the signal input through an N$^{th}$ path, the signal may be converted into signal sequences having different or equal phases/intensities by phase/intensity converters 412-N-1 to 412-N-M, be amplified by amplifiers 414-N-1 to 414-N-M, and then be transmitted through antennas.

FIG. 1DC is a circuit diagram of a communicator in a wireless communication system according to various embodiments of the disclosure.

Referring to FIG. 1DC, the signals input to the analog beamformer 408 may be converted in phase/intensity, be amplified, and then be transmitted through antennas. In this case, the signals of different paths may be transmitted through the same antenna set, i.e., the same antenna array. To process the signal input through a first path, the signal may be converted into signal sequences having different or equal phases/intensities by phase/intensity converters 412-1-1 to 412-1-M and be amplified by amplifiers 414-1-1 to 414-1-M. To process the signal input through an N$^{th}$ path, the signal may be converted into signal sequences having different or equal phases/intensities by phase/intensity converters 412-N-1 to 412-N-M and be amplified by amplifiers 414-N-1 to 414-N-M. Amplified signals of different paths may be added by adders 416-1 to 416-M and be transmitted through one antenna array.

FIG. 1DB illustrates an example in which different transmission paths use independent antenna arrays, and FIG. 1DC illustrates an example in which different transmission paths share one antenna array. However, according to another embodiment of the disclosure, some transmission paths may use independent antenna arrays and the other transmission paths may share one antenna array. According to another embodiment of the disclosure, by applying a switchable structure between transmission paths and antenna arrays, an adaptively variable structure may be used.

Embodiment 1: Method of Configuring, Measuring, and Reporting Reference Signal Per Bandwidth Part (BWP)

A base station may configure a certain reference signal for channel status measurement, e.g., a CSI-RS, for UEs belonging to the coverage of the base station and UEs belonging to the coverages of neighboring base stations. In this case, the CSI-RS may be configured to be subordinate to a specific BWP such that CSI-RS configuration information is included in DL BWP configuration information as shown in Table 1.

TABLE 1

```
BWP-Downlink ::=                        SEQUENCE {
    -- An identifier for this bandwidth part. Other parts of the RRC
configuration use the BWP-Id to associate themselves with a particular
    -- bandwidth part. The BWP ID=0 is always associated with the initial
BWP and may hence not be used here. (in other bandwidth parts).
    -- The NW may trigger the UE to switch UL or DL BWP using a DCI
field. The four code points in that DCI field map to the RRC-configured
    -- BWP-ID as follows: For up to 3 configured BWPs (in addition to the
initial BWP) the DCI code point is equivalent to the BWP ID
    -- (initial = 0, first dedicated = 1, ...). If the NW configures 4 dedicated
bandwidth parts, they are identified by DCI code
    -- points 0 to 3. In this case it is not possible to switch to the initial BWP
using the DCI field.
    -- Corresponds to L1 parameter 'DL-BWP-index'. (see 38.211, 38.213,
section 12)
    bwp-Id                              BWP-Id,
    bwp-Common                          BWP-
DownlinkCommon
        OPTIONAL, -- Need M
    bwp-Dedicated                       BWP-
DownlinkDedicated
        OPTIONAL, -- Need M
    csi-ResourceConfigId                CSI-ResourceConfigId
        OPTIONAL,
    nzp-CSI-RS-ResourceSetId            NZP-CSI-RS-ResourceSetId
        OPTIONAL,
    zp-CSI-RS-ResourceSetId             ZP-CSI-RS-
ResourceSetId
        OPTIONAL,
    nzp-CSI-RS-ResourceId
        OPTIONAL,
    zp-CSI-RS-ResourceId
        OPTIONAL,
    ...
}
```

Alternatively, each CSI-RS configuration information element (IE) may include a BWP-Id to which a corresponding CSI-RS belongs.

FIG. 1E is a flowchart of a procedure, performed by a UE, of receiving CSI-RS resource configuration information per BWP and performing measurement and reporting, according to an embodiment of the disclosure.

In operation 1e-1, the UE may receive CSI-RS resource configuration information per BWP from a network and check correlations between BWPs and CSI-RS resources.

In operation 1e-2, the UE may specify a current active BWP of the UE.

In operation 1e-3, the UE may specify a CSI-RS resource belonging to the active BWP specified in operation 1e-2.

In operation 1e-4, the UE may measure the CSI-RS resource specified in operation 1e-3.

In operation 1e-5, the UE may determine whether the CSI-RS resource measured in operation 1e-4 satisfies a preset measurement reporting condition, and transmit a measurement report upon determining that the CSI-RS resource satisfies the condition.

Although the flowchart of FIG. 1E is illustrated on the assumption of one active BWP, according to another embodiment of the disclosure, when two or more active BWPs are simultaneously usable, the UE may perform the procedure of FIG. 1E simultaneously on the two or more active BWPs.

The CSI-RS resource may be configured per BWP in such a manner that each CSI-RS resource configuration IE (CSI-ResourceConfig, non-zero power (NZP)-CSI-RS-Resource-Set, NZP-CSI-RS-Resource, CSI-interference measurement (IM)-ResourceSet, CSI-IM-Resource, zero power (ZP)-CSI-RS-ResourceSet, ZP-CSI-RS-Resource, . . . ) includes a BWP Id to which the CSI-RS resource belongs.

Figure 1F:
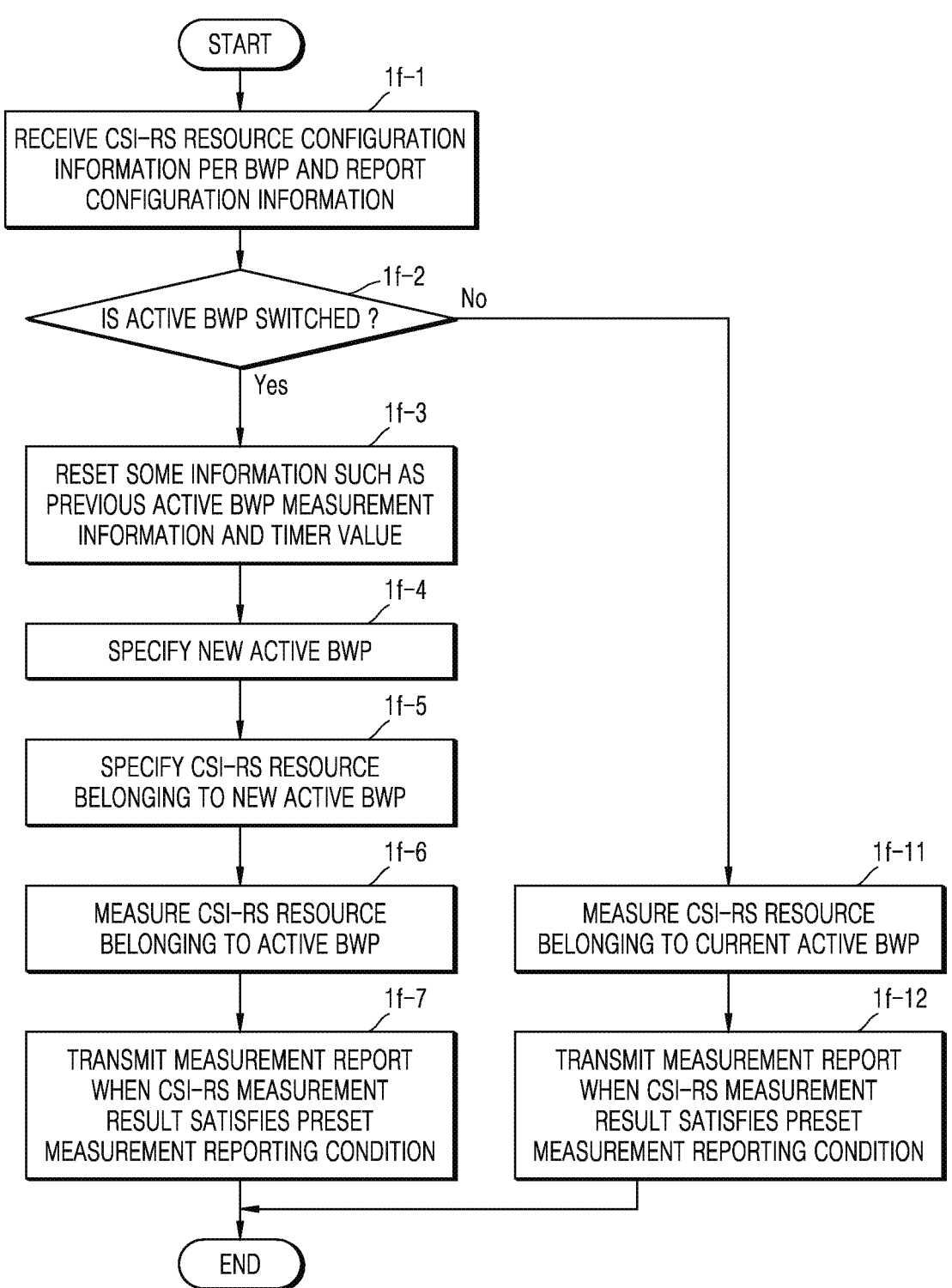
FIG. 1F is a flowchart of a procedure in a case in which an active BWP of a UE is switched in the procedure of FIG. 1E according to an embodiment of the disclosure.

FIG. 1F is a flowchart of a procedure in a case in which an active BWP of a UE is switched in the procedure of FIG. 1E. In operation 1f-1, the UE may receive CSI-RS resource configuration information per BWP from a network and check correlations between BWPs and CSI-RS resources.

In operation 1f-2, the UE determines whether a current active BWP of the UE is switched. Upon determining that the active BWP is not switched, the UE may perform operations 1f-11 and 1f-12 to continuously measure a CSI-RS resource belonging to the current active BWP and transmit a measurement report when a specific reporting condition is satisfied.

Upon determining, in operation 1f-2, that the active BWP is switched, in operation 1f-3, the UE may discard and reset the entirety or a part of information related to a previous active BWP. The information to be discarded or reset may be as described below.

CSI-RS measurement information in the BWP (e.g., memory storing a filter value and a sample value) is discarded.

Timer, counter, and measurement value information related to beam failure detection in the BWP is discarded.

Timer, counter, and measurement value information related to radio link monitoring in the BWP is discarded.

Stored information related to a hybrid automatic repeat request (HARQ) in the BWP is discarded.

Timer and counter information related to discontinuous reception (DRX) (or connected mode discontinuous reception (C-DRX)) in the BWP is discarded.

In operation 1f-4, the UE may specify a new active BWP.

In operation 1f-5, the UE may specify a CSI-RS resource belonging to the new active BWP specified in operation 1f-4.

In operation 1f-6, the UE may measure the CSI-RS resource specified in operation 1f-5.

In operation 1f-7, the UE may determine whether the CSI-RS resource measured in operation 1f-6 satisfies a preset measurement reporting condition, and transmit a measurement report upon determining that the CSI-RS resource satisfies the condition.

Although the flowchart of FIG. 1F is illustrated on the assumption of one active BWP, when two or more active BWPs are simultaneously usable, the UE may perform the procedure of FIG. 1F simultaneously on the two or more active BWPs. That is, the UE may perform the procedure of FIG. 1F simultaneously or sequentially on a plurality of active BWPs.

According to an embodiment of the disclosure, the CSI-RS resource may be configured per BWP in such a manner that each CSI-RS resource configuration IE (CSI-ResourceConfig, NZP-CSI-RS-ResourceSet, NZP-CSI-RS-Resource, CSI-IM-ResourceSet, CSI-IM-Resource, ZP-CSI-RS-ResourceSet, ZP-CSI-RS-Resource, . . . ) includes a BWP Id to which the CSI-RS resource belongs.

Embodiment 2: Method of Including Multi-BWP Information in Reference Signal Configuration Information A base station may configure a certain reference signal for channel status measurement, e.g., a CSI-RS, for UEs belonging to the coverage of the base station and UEs belonging to the coverages of neighboring base stations. In this case, when the configured CSI-RS is associated with only one BWP, the following problems may occur.

Problem 1: Multiple CSI-ResourceConfig IEs Need to be Configured when Measurement of the Same CSI-RS is Required by Overlapping BWPs.

Figure 1G:
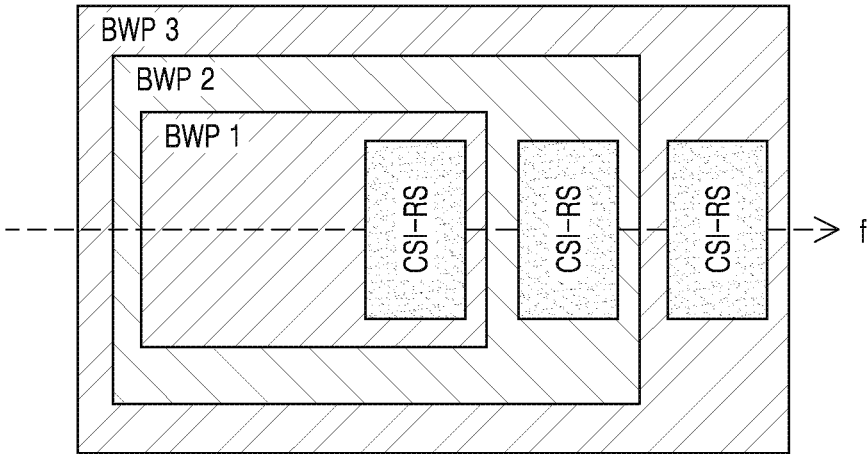
FIG. 1GA is a schematic diagram for describing a problem that a CSI-RS resource configuration information element (IE) needs to be repeatedly transmitted for BWPs according to an embodiment of the disclosure.
Figure 1G:
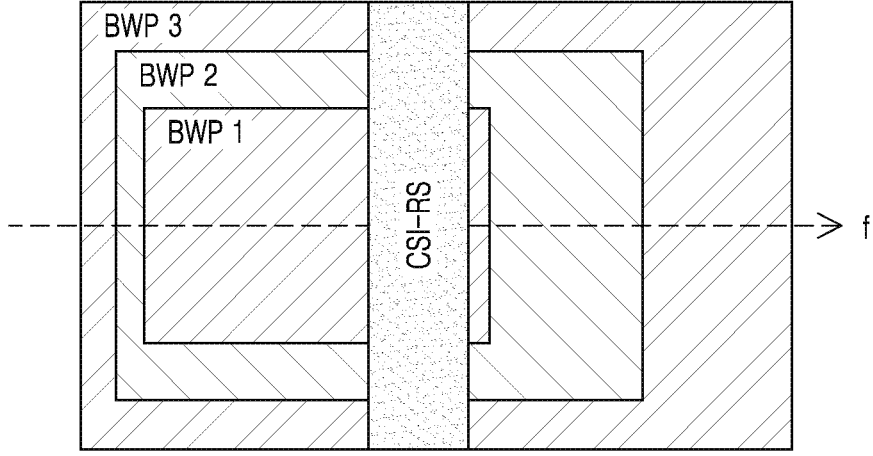
Figure 1G:
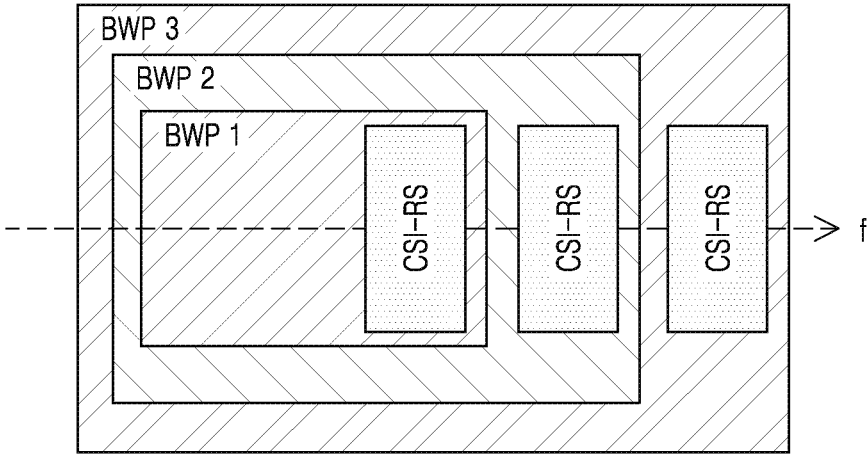
Figure 1G:
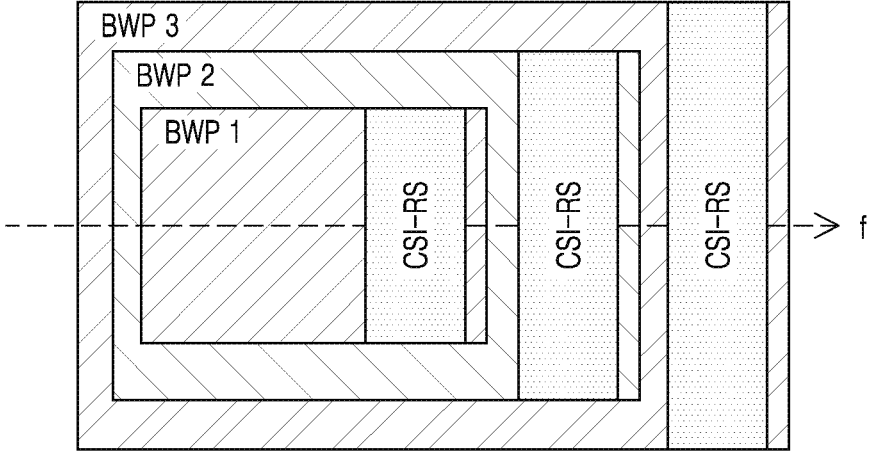

FIGS. 1GA to 1GD are schematic diagrams for describing a problem that, when overlapping BWPs include the same CSI-RS and one CSI-RS is configurable for only one BWP, a CSI-RS resource configuration IE for CSI-RS measurement needs to be repeatedly transmitted for the BWPs. As illustrated in FIGS. 1GA and 1GB, a network may configure only one CSI-RS and want a UE to adaptively measure the CSI-RS based on bandwidths of overlapping BWPs. However, because one CSI-RS is configurable for only one BWP, as illustrated in FIGS. 1GC and 1GD, the network repeatedly transmits a configuration IE as if three different CSI-RSs are configured. The UE may determine the configured CSI-RSs as different CSI-RSs and thus unnecessarily repeat the same filtering, condition comparing, and reporting operation even though resources thereof are the same. In addition, memory capacity may be additionally used.

Problem 2: Multiple CSI-RSs Need to be Configured Per BWP

Figure 1H:
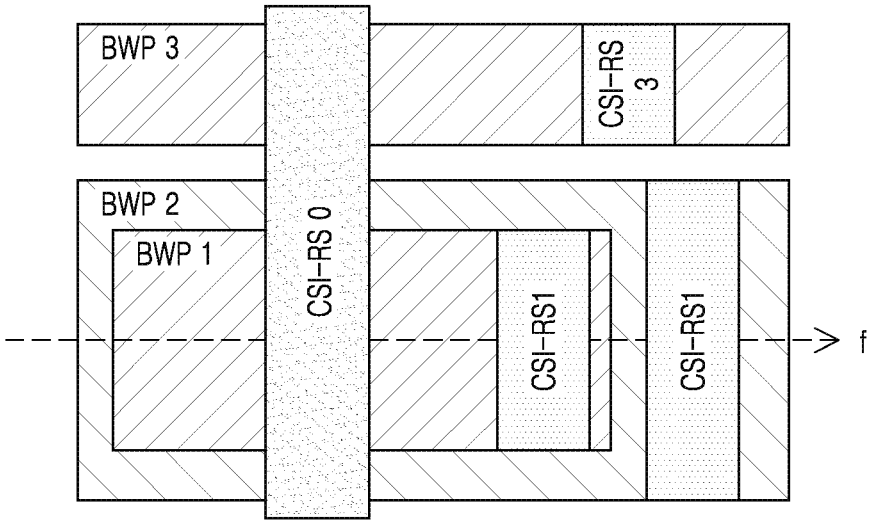
FIG. 1H is a schematic diagram for describing a problem that multiple CSI-RS resource configuration IEs need to be transmitted per BWP according to an embodiment of the disclosure.

FIG. 1H is a schematic diagram for describing a problem that, when overlapping BWPs and individual BWPs are present and one CSI-RS is configurable for only one BWP, multiple CSI-RS resource configuration IEs need to be transmitted per BWP. Because multiple CSI-RS resources having equal or different resource element regions are configurable in an overlapping manner based on the number of BWPs, the number of CSI-RS resource sets, and the number of CSI-RS configuration IEs, the number of CSI-RS resources to be transmitted by a network and to be received and managed by a UE may be exponentially increased.

To solve the above-described problem, the network may configure and transmit CSI-RSs over a wide frequency band. The frequency band for which the CSI-RSs are transmitted may include one or more BWPs. Information about the one or more BWPs may be included in CSI-RS configuration information which may be configured as shown in Table 2.

TABLE 2

```
-- ASN1START
-- TAG-CSI-RESOURCECONFIG-START
-- One CSI resource configuration comprising of one or more resource sets
CSI-ResourceConfig ::=                SEQUENCE {
    -- Used in CSI-ReportConfig to refer to an instance of CSI-
ResourceConfig
    csi-ResourceConfigId                CSI-ResourceConfigId,
    -- Contains up to maxNrofNZP-CSI-RS-ResourceSetsPerConfig resource
sets if ResourceConfigType is 'aperiodic' and 1 otherwise.
    -- Corresponds to L1 parameter 'ResourceSetConfigList' (see 38.214,
section 5.2.1.3.1)
    csi-RS-ResourceSetList                CHOICE {
        nzp-CSI-RS-SSB
        SEQUENCE {
            nzp-CSI-RS-ResourceSetList
        SEQUENCE (SIZE (1..maxNrofNZP-CSI-RS-ResourceSetsPerConfig))
OF NZP-CSI-RS-ResourceSetId OPTIONAL,
            -- List of SSB resources used for beam measurement and
reporting in a resource set
            -- Corresponds to L1 parameter 'resource-config-SS-list' (see
38,214, section FFS_Section)
            csi-SSB-ResourceSetList
        SEQUENCE (SIZE (1..maxNrofCSI-SSB-ResourceSetsPerConfig)) OF
CSI-SSB-ResourceSetId    OPTIONAL
        },
        csi-IM-ResourceSetList                SEQUENCE (SIZE
(1..maxNrofCSI-IM-ResourceSetsPerConfig)) OF CSI-IM-ResourceSetId
        },
    -- The DL BWPs which the CSI-RS associated with this CSI-
ResourceConfig.
    -- Corresponds to L1 parameter 'BWP-Info' (see 38.214, section 5.2.1.2
    bwp-IdList                SEQUENCE
(SIZE(1..maxBWP-Id)) OF BWP-Id OPTIONAL,
    -- Time domain behavior of resource configuration. Corresponds to L1
parameter 'ResourceConfigType' (see 38.214, section 5.2.2.3.5)
    resourceType                ENUMERATED
{ aperiodic, semiPersistent, periodic },
    ...
}
-- TAG-CSI-RESOURCECONFIGTOADDMOD-STOP
-- ASN1STOP
```

Although a current active BWP usable by the UE is switched, the UE having received CSI-RS configuration information including multi-BWP information may specify whether a CSI-RS configured over a previous active BWP and the current active BWP is present. When the CSI-RS is present, the UE may continuously measure the CSI-RS and transmit a measurement report thereof without discarding a measurement value of or a counter or timer related to the CSI-RS.

Figure 1I:
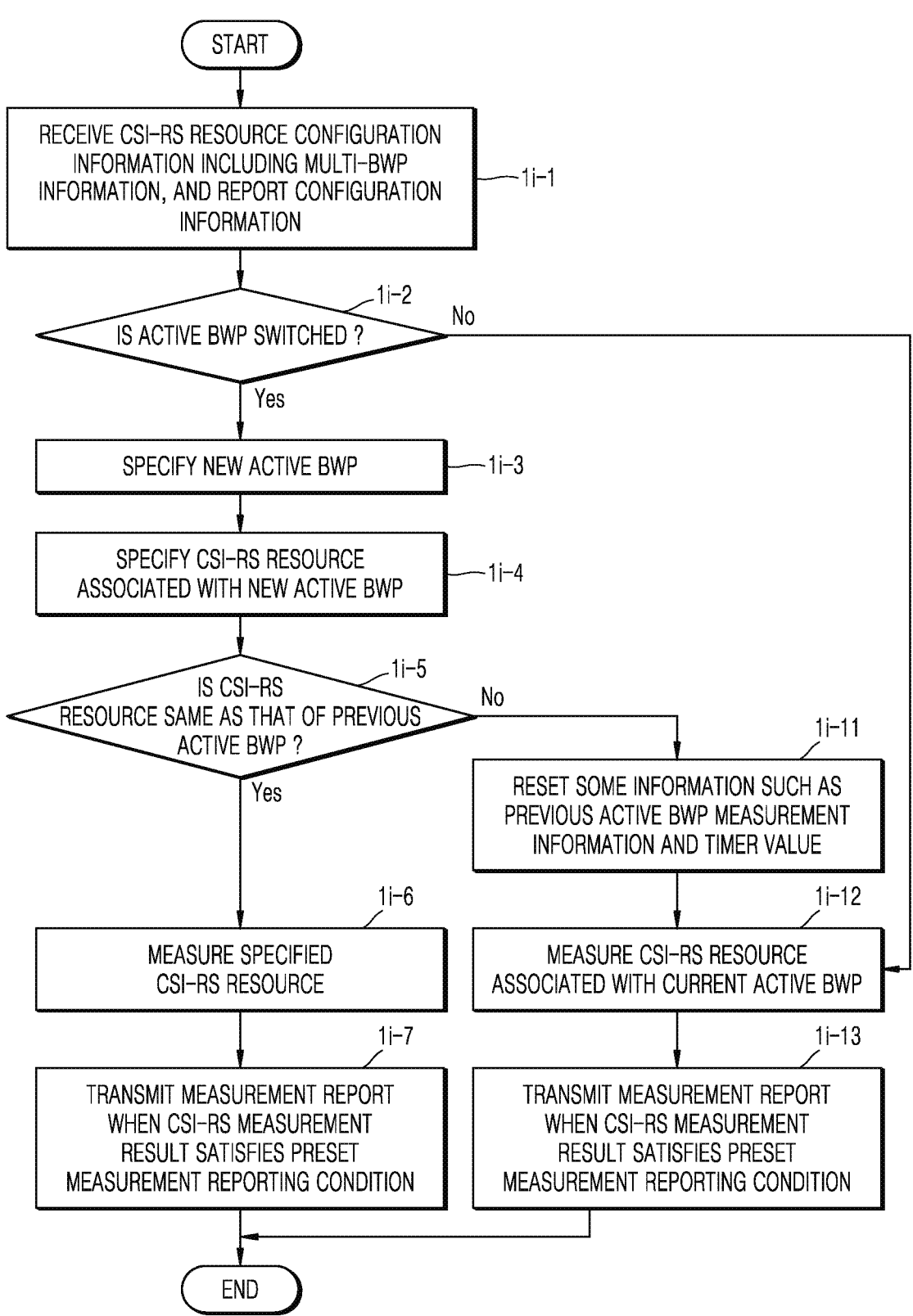
FIG. 1I is a flowchart of a procedure in a case in which an active BWP of a UE is switched, according to an embodiment of the disclosure.

FIG. 1I is a flowchart of a procedure in a case in which an active BWP of a UE is switched, according to another embodiment of the disclosure.

In operation 1i-1, the UE may receive CSI-RS resource configuration information including multi-BWP configuration information from a network and check correlations between CSI-RS resources and BWPs associated with the CSI-RS resources. In embodiments of the disclosure, the multi-BWP configuration information may be included in the multi-BWP information.

In operation 1i-2, the UE may determine whether a current active BWP of the UE is switched.

Upon determining that the active BWP is not switched, the UE may perform operations 1i-12 and 1i-13 to continuously measure a CSI-RS resource belonging to the current active BWP and transmit a measurement report when a specific reporting condition is satisfied.

Upon determining, in operation 1i-2, that the active BWP is switched, in operation 1i-3, the UE may specify a new active BWP. The specification of the new active BWP refers to an operation, performed by the UE, of checking information corresponding to a BWP Id included in a DL signal previously received from a base station to switch a BWP, from BWP information previously received from the base station, and specifying an RF end, e.g., a center frequency, a frequency band, and a reception resource element, of the UE based on the BWP information.

In operation 1i-4, the UE may specify a CSI-RS resource(s) associated with the new active BWP specified in operation 1i-3, i.e., including a new active BWP ID in corresponding CSI-RS resource configuration information.

In operation 1i-5, the UE may determine whether the CSI-RS resource specified in operation 1i-4 is the same as a preset CSI-RS resource measured in a previous active BWP. The determination may be made based on the following cases.

A case in which both of an Id of the previous active BWP and an Id of the new active BWP specified in operation 1i-3 are included in an associated BWP-Id list included in corresponding CSI-RS ResourceConfig, NZP, ZP, or IM CSI-RS-ResourceSet, or NZP, ZP, or IM CSI-RS-Resource.

A case in which both of an Id of the previous active BWP and an Id of the new active BWP specified in operation 1*i*-3, which are included in a table received by the UE from the base station and specifying correlations between BWPs and CSI-RSs, include a ResourceConfig Id, a NZP, ZP or IM CSI-RS-ResourceSet Id, or a NZP, ZP or IM CSI-RS-Resource Id of the CSI-RS resource specified in operation 1*i*-4.

A case in which, when a certain CSI-RS including a measurement frequency bandwidth or a resource element of the previous active BWP of the UE is present, a measurement frequency bandwidth of the new active BWP of the UE is included in a transmission frequency bandwidth or a resource element region of the CSI-RS.

Upon determining that the CSI-RS resource specified in operation 1*i*-4 is not the same as the preset CSI-RS resource measured in the previous active BWP, in operation 1*i*-11, the UE may discard and reset the entirety or a part of information related to the previous active BWP. The information to be discarded or reset may be as described below.

CSI-RS measurement information in the BWP (e.g., memory storing a filter value and a sample value) is discarded.

Timer, counter, and measurement value information related to beam failure detection in the BWP is discarded.

Timer, counter, and measurement value information related to radio link monitoring in the BWP is discarded.

Stored information related to a HARQ in the BWP is discarded.

Timer and counter information related to DRX (or C-DRX) in the BWP is discarded.

After operation 1*i*-11, the UE may perform operations 1*i*-12 and 1*i*-13 to continuously measure a CSI-RS resource belonging to the current active BWP and transmit a measurement report when a specific reporting condition is satisfied.

Upon determining, in operation 1*i*-5, that the CSI-RS resource specified in operation 1*i*-4 is the same as the preset CSI-RS resource measured in the previous active BWP, in operation 1*i*-6, the UE may continuously measure the CSI-RS resource specified in operation 1*i*-4. The UE may input the CSI-RS measurement value measured in the new active BWP, to an L1/L3 measurement filter to which the CSI-RS measurement value in the previous active BWP has been input, to obtain a result thereof, and maintain a timer triggered by the CSI-RS or related to beam failure detection, radio link monitoring, radio link failure, and DRX, to perform a related operation.

In operation 1*i*-7, the UE determines whether the CSI-RS resource measured in operation 1*i*-6 satisfies a preset measurement reporting condition, and transmit a measurement report upon determining that the CSI-RS resource satisfies the condition. The measurement report may include BWP-Id information indicating a certain BWP in which the CSI-RS resource is measured, or include a 1-bit indicator indicating that the CSI-RS resource is measured in two or more BWPs, and/or one or more BWP Ids.

Although the flowchart of FIG. 1I is illustrated on the assumption of one active BWP, according to another embodiment of the disclosure, when two or more active BWPs are simultaneously usable, the UE may perform the procedure of FIG. 1I simultaneously on the two or more active BWPs.

The CSI-RS resource may be configured per BWP in such a manner that each CSI-RS resource configuration IE (CSI-ResourceConfig, NZP-CSI-RS-ResourceSet, NZP-CSI-RS-Resource, CSI-IM-ResourceSet, CSI-IM-Resource, ZP-CSI-RS-ResourceSet, ZP-CSI-RS-Resource, . . . ) includes a BWP Id to which the CSI-RS resource belongs.

In the active BWP specification operation and the CSI-RS specification operation, the UE may specify one or more BWPs and CSI-RSs and perform subsequent operations on each of the BWPs and the CSI-RSs.

Embodiment 3: Method of Including Multi-BWP Information in Other Reference Signal Correlation Configuration Information According to another embodiment of the disclosure, a UE may use correlations between reference signals and BWPs, which are included in information other than CSI-RS configuration information.

The UE may receive, from a base station, information including correlations between one or more BWPs and one or more CSI-RSs as described below. In this case, CSI-RS configuration information transmitted from a network to the UE may not include a specific BWP-Id. To this end, the network may configure a BWP-Id in a CSI-ResourceConfig 1E, as optional information, and configure a condition shown in Table 3.

TABLE 3

| Conditional Presence | Explanation |
| --- | --- |
| CSI-over-multiple-BWPs | If the CSI-RS resource config is configured over multiple BWPs, this field is absent, otherwise, it is mandatory present. |

An example of the other information is shown in Table 4.

TABLE 4

```
-- ASN1START
-- TAG-TCI-STATE-START
TCI-State ::=                    SEQUENCE {
    tci-StateId                      TCI-StateId,
    qcl-Type1                        QCL-Info,
    qcl-Type2                        QCL-Info
                                     OPTIONAL, -- Need R
    nrofPTRS-Ports                   ENUMERATED {n1, n2}
                                     OPTIONAL, -- Need R
    ...
}
QCL-Info ::=                     SEQUENCE {
    -- The carrier which the RS is located in. If the field is absent, it applies to
    the serving cell in which the TCI-State is configured
    cell                             ServCellIndex
                                     OPTIONAL, -- Need R
```

TABLE 4-continued

```
-- The DL BWP which the RS is located in.
  bwp-IdList                           SEQUENCE
(SIZE(1..maxBWP-Id)) OF BWP-Id OPTIONAL, -- Cond CSI-RS-Indicated
  -- Cond NZP-CSI-RS-Indicated: mandatory if csi-rs or csi-RS-for-tracking
is included, absent otherwise
  referenceSignal                      CHOICE {
    csi-rs                             NZP-CSI-RS-ResourceId,
    ssb                                SSB-Index,
    -- A set of CSI-RS resources for tracking
    csi-RS-for-tracking                NZP-CSI-RS-ResourceSetId
  },
  qcl-Type                             ENUMERATED {typeA, typeB,
typeC, typeD},
  ...
}
-- TAG-TCI-STATE-STOP
-- ASN1STOP
```

The UE having received QCL information may check correlations between certain BWP Ids belonging to a certain cell, and certain reference signals, and more specifically, CSI-RSs. When such information about all BWPs in a specific cell, and all CSI-RSs is received, the UE may check correlations between all BWPs in the cell, and CSI-RSs. Although a current active BWP usable by the UE is switched, the UE having received such information may specify whether a CSI-RS configured over a previous active BWP and the current active BWP is present. As such, when the CSI-RS is present, the UE may continuously measure the CSI-RS and transmit a measurement report thereof without discarding a measurement value of or a counter or timer related to the CSI-RS.

FIG. 1J is a flowchart of a procedure in a case in which an active BWP of a UE is switched, according to another embodiment of the disclosure.

In operation 1*j*-0, the UE may receive CSI-RS resource configuration information and report configuration information from a network.

In operation 1*j*-1, the UE may receive, from the network, information indicating correlations between CSI-RSs configured by the CSI-RS resource configuration information, and multiple BWPs in a cell, and check correlations between CSI-RS resources and BWPs associated with the CSI-RS resources.

In operation 1*j*-2, the UE may determine whether a current active BWP of the UE is switched.

Upon determining that the active BWP is not switched, the UE may perform operations 1*j*-12 and 1*j*-13 to continuously measure a CSI-RS resource belonging to the current active BWP and transmit a measurement report when a specific reporting condition is satisfied.

Upon determining, in operation 1*j*-2, that the active BWP is switched, in operation 1*j*-3, the UE may specify a new active BWP. The specification of the new active BWP refers to an operation, performed by the UE, of checking information corresponding to a BWP Id included in a DL signal previously received from a base station to switch a BWP, from BWP information previously received from the base station, and specifying an RF end, e.g., a center frequency, a frequency band, and a reception resource element, of the UE based on the BWP information.

In operation 1*j*-4, the UE may specify a CSI-RS resource associated with the new active BWP specified in operation 1*j*-3, i.e., including a new active BWP ID in corresponding CSI-RS resource configuration information.

In operation 1*j*-5, the UE may determine whether the CSI-RS resource specified in operation 1*j*-4 is the same as a preset CSI-RS resource measured in a previous active BWP. The determination may be made based on the following cases.

A case in which both of an Id of the previous active BWP and an Id of the new active BWP specified in operation 1*j*-3 are included in an associated BWP-Id list included in corresponding CSI-RS ResourceConfig, NZP, ZP, or IM CSI-RS-ResourceSet, or NZP, ZP, or IM CSI-RS-Resource.

A case in which both of an Id of the previous active BWP and an Id of the new active BWP specified in operation 1*j*-3, which are included in a table received by the UE from the base station and specifying correlations between BWPs and CSI-RSs, include a ResourceConfig Id, a NZP, ZP or IM CSI-RS-ResourceSet Id, or a NZP, ZP or IM CSI-RS-Resource Id of the CSI-RS resource specified in operation 1*j*-4.

A case in which, when a certain CSI-RS including a measurement frequency bandwidth or a resource element of the previous active BWP of the UE is present, a measurement frequency bandwidth of the new active BWP of the UE is included in a transmission frequency bandwidth or a resource element region of the CSI-RS.

Upon determining that the CSI-RS resource specified in operation 1*j*-4 is not the same as the preset CSI-RS resource measured in the previous active BWP, in operation 1*j*-11, the UE may discard and reset the entirety or a part of information related to the previous active BWP. The information to be discarded or reset may be as described below, but is not limited thereto.

CSI-RS measurement information in the BWP (e.g., memory storing a filter value and a sample value) is discarded.

Timer, counter, and measurement value information related to beam failure detection in the BWP is discarded.

Timer, counter, and measurement value information related to radio link monitoring in the BWP is discarded.

Stored information related to a HARQ in the BWP is discarded.

Timer and counter information related to DRX (or C-DRX) in the BWP is discarded.

After operation 1*j*-11, the UE may perform operations 1*j*-12 and 1*j*-13 to continuously measure a CSI-RS resource belonging to the current active BWP and transmit a measurement report when a specific reporting condition is satisfied.

Upon determining, in operation 1*j*-5, that the CSI-RS resource specified in operation 1*j*-4 is the same as the preset CSI-RS resource measured in the previous active BWP, in operation 1*j*-6, the UE may continuously measure the CSI-RS resource specified in operation 1*j*-4. The UE may input the CSI-RS measurement value measured in the new active BWP, to an L1/L3 measurement filter to which the CSI-RS measurement value in the previous active BWP has been input, to obtain a result thereof, and maintain a timer triggered by the CSI-RS or related to beam failure detection, radio link monitoring, radio link failure, and DRX, to perform a related operation.

In operation 1*j*-7, the UE determines whether the CSI-RS resource measured in operation 1*j*-6 satisfies a preset measurement reporting condition, and transmit a measurement report upon determining that the CSI-RS resource satisfies the condition. The measurement report may include BWP-Id information indicating a certain BWP in which the CSI-RS resource is measured, or include a 1-bit indicator indicating that the CSI-RS resource is measured in two or more BWPs, and/or one or more BWP Ids.

Although the flowchart of FIG. 1J is illustrated on the assumption of one active BWP, according to another embodiment of the disclosure, when two or more active BWPs are simultaneously usable, the UE may perform the procedure of FIG. 1J simultaneously on the two or more active BWPs.

The CSI-RS resource may be configured per BWP in such a manner that each CSI-RS resource configuration IE (CSI-ResourceConfig, NZP-CSI-RS-ResourceSet, NZP-CSI-RS-Resource, CSI-IM-ResourceSet, CSI-IM-Resource, ZP-CSI-RS-ResourceSet, ZP-CSI-RS-Resource, . . . ) includes a BWP Id to which the CSI-RS resource belongs.

In the active BWP specification operation and the CSI-RS specification operation, the UE may specify one or more BWPs and CSI-RSs and perform subsequent operations on each of the BWPs and the CSI-RSs.

Embodiment 4: Method of Including, in Reference Signal Configuration Information, Multi-BWP Information Including Other Reference Signal Configuration Information Referred by the Reference Signal Configuration Information According to another embodiment of the disclosure, a network may configure the same CSI-RS for different BWPs and transmit CSI-RS configuration information. In this regard, CSI-RS resource configuration is omitted (e.g., csi-RS-ResourceSetList is not omitted) in a certain configuration signal from among signals transmitted to a UE, and CSI-RS configuration information may be configured to include a CSI-RS configuration ID or a BWP Id using the same resource configuration, as shown in Tables 5 and 6.

TABLE 5

```
-- ASN1START
-- TAG-CSI-RESOURCECONFIG-START
-- One CSI resource configuration comprising of one or more resource sets
CSI-ResourceConfig ::=                    SEQUENCE {
    -- Used in CSI-ReportConfig to refer to an instance of CSI-
ResourceConfig
    csi-ResourceConfigId                  CSI-ResourceConfigId,
    -- Contains up to maxNrofNZP-CSI-RS-ResourceSetsPerConfig resource
sets if ResourceConfigType is 'aperiodic' and 1 otherwise.
    -- Corresponds to L1 parameter 'ResourceSetConfigList' (see 38.214,
section 5.2.1.3.1)
    csi-RS-ResourceSetList                CHOICE {
      nzp-CSI-RS-SSB
    SEQUENCE {
        nzp-CSI-RS-ResourceSetList
      SEQUENCE (SIZE (1..maxNrofNZP-CSI-RS-ResourceSetsPerConfig))
OF NZP-CSI-RS-ResourceSetId OPTIONAL,
        -- List of SSB resources used for beam measurement and
reporting in a resource set
        -- Corresponds to L1 parameter 'resource-config-SS-list' (see
38,214, section FFS_Section)
        csi-SSB-ResourceSetList
      SEQUENCE (SIZE (1..maxNrofCSI-SSB-ResourceSetsPerConfig)) OF
CSI-SSB-ResourceSetId   OPTIONAL
      },
        csi-IM-ResourceSetList                SEQUENCE (SIZE
(1..maxNrofCSI-IM-ResourceSetsPerConfig)) OF CSI-IM-ResourceSetId
    } OPTIONAL,
    -- The DL BWPs which the CSI-RS associated with this CSI-
ResourceConfig.
    -- Corresponds to L1 parameter 'BWP-Info' (see 38.214, section 5.2.1.2
    bwp-IdList                           SEQUENCE
(SIZE(1..maxBWP-Id)) OF BWP-Id OPTIONAL,
    ref-csi-ResourceConfigId             CSI-ResourceConfigId
      OPTIONAL, -- Cond Duplicated-CSI-RS-ResourceSetList
    -- Time domain behavior of resource configuration. Corresponds to L1
parameter 'ResourceConfigType' (see 38.214, section 5.2.2.3.5)
    resourceType                         ENUMERATED
{ aperiodic, semiPersistent, periodic },
    ...
}
-- TAG-CSI-RESOURCECONFIGTOADDMOD-STOP
-- ASN1STOP
```

TABLE 6

| Conditional Presence | Explanation |
| --- | --- |
| Duplicated-CSI-RS-ResourceSetList | If csi-RS-ResourceSetList is absent, this field is optionally present, otherwise, it is absent. |

Although a current active BWP to which the UE belongs is switched, the UE having received CSI-RS configuration information including multi-BWP information may specify whether a CSI-RS configured over a previous active BWP and the current active BWP is present. As such, when the CSI-RS is present, the UE may continuously measure the CSI-RS and transmit a measurement report thereof without discarding a measurement value of or a counter or timer related to the CSI-RS.

Figure 1K:
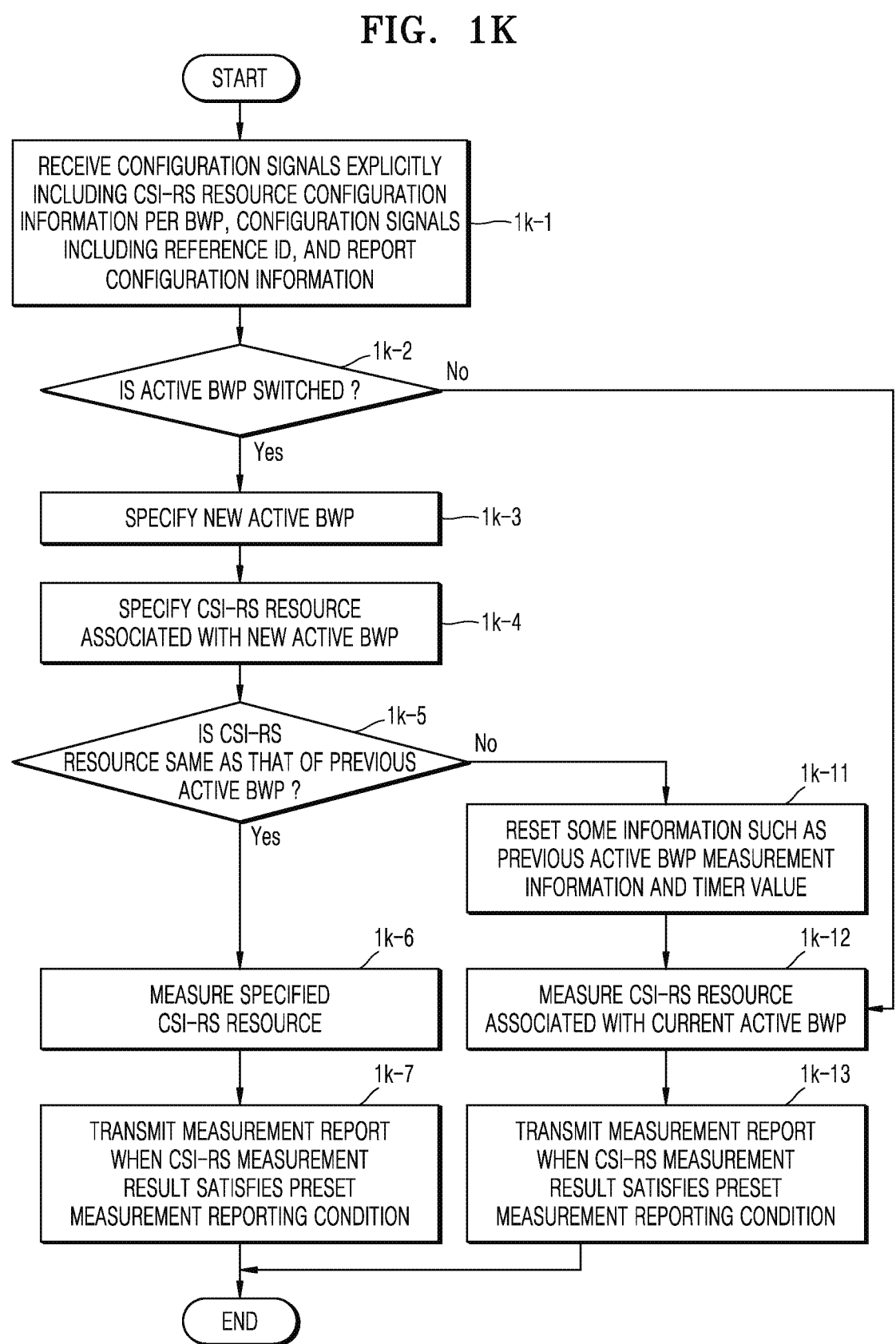
FIG. 1K is a flowchart of a procedure in a case in which an active BWP of a UE is switched, according to an embodiment of the disclosure.

FIG. 1K is a flowchart of a procedure in a case in which an active BWP of a UE is switched, according to another embodiment of the disclosure.

In operation 1k-1, the UE may receive CSI-RS resource configuration information including multi-BWP configuration information from a network and check correlations between CSI-RS resources and BWPs associated with the CSI-RS resources. In embodiments of the disclosure, the multi-BWP configuration information may be included in the multi-BWP information.

In operation 1k-2, the UE may determine whether a current active BWP of the UE is switched.

Upon determining that the active BWP is not switched, the UE may perform operations 1k-12 and 1k-13 to continuously measure a CSI-RS resource belonging to the current active BWP and transmit a measurement report when a specific reporting condition is satisfied.

Upon determining, in operation 1k-2, that the active BWP is switched, in operation 1k-3, the UE may specify a new active BWP. The specification of the new active BWP refers to an operation, performed by the UE, of checking information corresponding to a BWP Id included in a DL signal previously received from a base station to switch a BWP, from BWP information previously received from the base station, and specifying an RF end, e.g., a center frequency, a frequency band, and a reception resource element, of the UE based on the BWP information.

In operation 1k-4, the UE may specify a CSI-RS resource associated with the new active BWP specified in operation 1k-3, i.e., including a new active BWP ID in corresponding CSI-RS resource configuration information.

In operation 1k-5, the UE may determine whether the CSI-RS resource specified in operation 1k-4 is the same as a preset CSI-RS resource measured in a previous active BWP. The determination may be made based on the following cases.

A case in which both of an Id of the previous active BWP and an Id of the new active BWP specified in operation 1k-3 are included in an associated BWP-Id list included in corresponding CSI-RS ResourceConfig, NZP, ZP, or IM CSI-RS-ResourceSet, or NZP, ZP, or IM CSI-RS-Resource.

A case in which both of an Id of the previous active BWP and an Id of the new active BWP specified in operation 1k-3, which are included in a table received by the UE from the base station and specifying correlations between BWPs and CSI-RSs, include a ResourceConfig Id, a NZP, ZP or IM CSI-RS-ResourceSet Id, or a NZP, ZP or IM CSI-RS-Resource Id of the CSI-RS resource specified in operation 1k-4.

A case in which, when a certain CSI-RS including a measurement frequency bandwidth or a resource element of the previous active BWP of the UE is present, a measurement frequency bandwidth of the new active BWP of the UE is included in a transmission frequency bandwidth or a resource element region of the CSI-RS.

A case in which it is determined that different CSI-ResourceConfig IEs configured in two different BWPs have the same CSI-RS resource configuration information, based on a CSI-RS set or CSI-RS resource configuration information included in CSI-RS ResourceConfig associated with the previous active BWP or the new active BWP (configured in each active BWP), and a reference ID (e.g., a CSI-ResourceConfigId or a BWP-Id) referring to the CSI-RS set or the CSI-RS resource configuration information.

Upon determining that the CSI-RS resource specified in operation 1k-4 is not the same as the preset CSI-RS resource measured in the previous active BWP, in operation 1k-11, the UE may discard and reset the entirety or a part of information related to the previous active BWP. The information to be discarded or reset may be as described below.

CSI-RS measurement information in the BWP (e.g., memory storing a filter value and a sample value) is discarded.

Timer, counter, and measurement value information related to beam failure detection in the BWP is discarded.

Timer, counter, and measurement value information related to radio link monitoring in the BWP is discarded.

Stored information related to a HARQ in the BWP is discarded.

Timer and counter information related to DRX (or C-DRX) in the BWP is discarded.

After operation 1k-11, the UE may perform operations 1k-12 and 1k-13 to continuously measure a CSI-RS resource belonging to the current active BWP and transmit a measurement report when a specific reporting condition is satisfied.

Upon determining, in operation 1k-5, that the CSI-RS resource specified in operation 1k-4 is the same as the preset CSI-RS resource measured in the previous active BWP, in operation 1k-6, the UE may continuously measure the CSI-RS resource specified in operation 1k-4. The UE may input the CSI-RS measurement value measured in the new active BWP, to an L1/L3 measurement filter to which the CSI-RS measurement value in the previous active BWP has been input, to obtain a result thereof, and maintain a timer triggered by the CSI-RS or related to beam failure detection, radio link monitoring, radio link failure, and DRX, to perform a related operation.

In operation 1k-7, the UE determines whether the CSI-RS resource measured in operation 1k-6 satisfies a preset measurement reporting condition, and transmit a measurement report upon determining that the CSI-RS resource satisfies the condition. The measurement report may include BWP-Id information indicating a certain BWP in which the CSI-RS resource is measured, or include a 1-bit indicator indicating that the CSI-RS resource is measured in two or more BWPs, and/or one or more BWP Ids.

Although the flowchart of FIG. 1K is illustrated on the assumption of one active BWP, when two or more active BWPs are simultaneously usable, the UE may perform the procedure of FIG. 1K simultaneously on the two or more active BWPs.

The CSI-RS resource may be configured per BWP in such a manner that each CSI-RS resource configuration IE (CSI-ResourceConfig, NZP-CSI-RS-ResourceSet, NZP-CSI-RS-Resource, CSI-IM-ResourceSet, CSI-IM-Resource, ZP-CSI-RS-ResourceSet, ZP-CSI-RS-Resource, . . . ) includes a BWP Id to which the CSI-RS resource belongs.

In the active BWP specification operation and the CSI-RS specification operation, the UE may specify one or more BWPs and CSI-RSs and perform subsequent operations on each of the BWPs and the CSI-RSs.

Figure 2A:
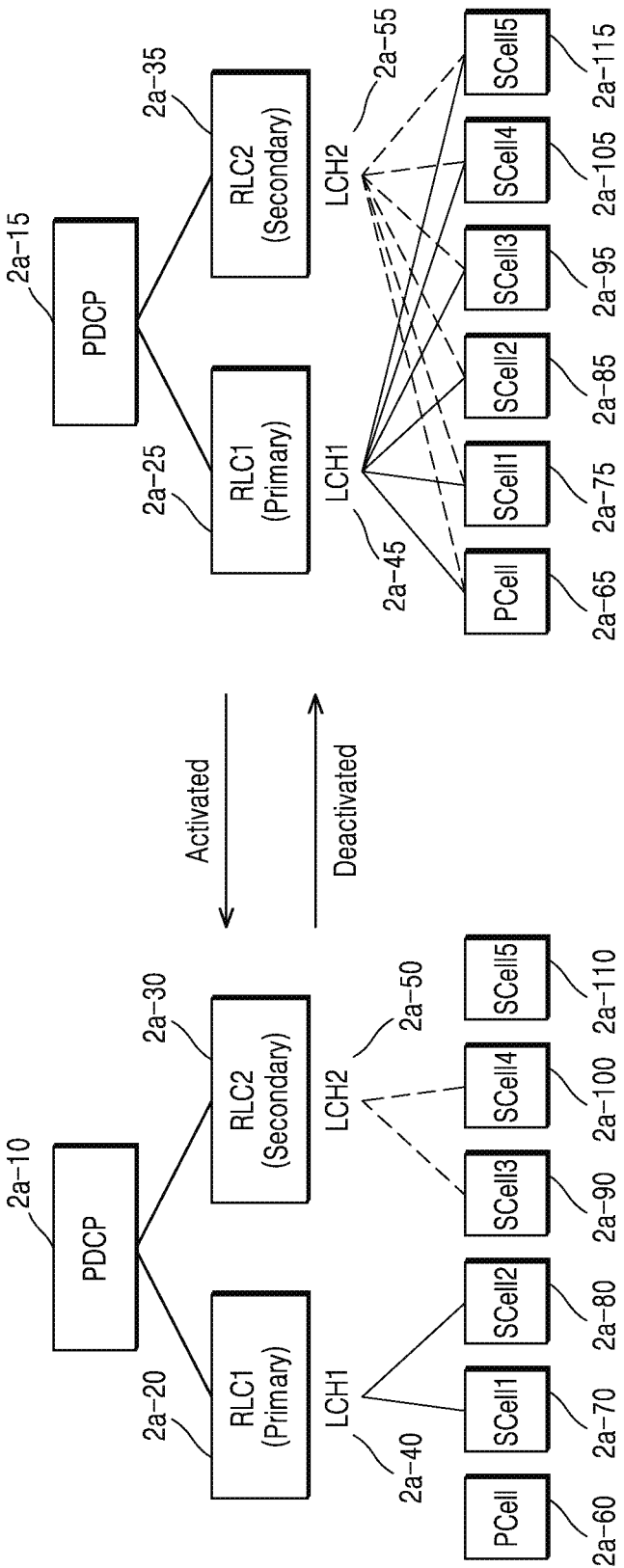
FIG. 2A is a schematic diagram of a structure for performing packet duplication transmission according to an embodiment of the disclosure.

FIG. 2A is a schematic diagram of a structure for performing packet duplication transmission in a carrier aggregation (CA) environment. Packet duplication transmission refers to a technology by which one packet data convergence protocol (PDCP) entity (e.g. a PDCP entity 2a-10) duplicates a packet (i.e., a PDCP protocol data unit (PDU)) and sends the packets to two or more radio link control (RLC) entities (e.g. an RLC1 2a-20 and an RLC2 2a-30) to independently transmit the packets. RLC entities connected to a PDCP entity may be defined as a primary RLC entity and a secondary RLC entity. A PDCP layer (also referred to as entity) of a transmitter may send a packet to the primary RLC entity regardless of whether packet duplication is activated. The PDCP layer of the transmitter may send a packet to the secondary RLC entity only when packet duplication is activated. In this case, one RLC entity may correspond to one logical channel. Mapping between logical channels and cells may be required to effectively performing packet duplication transmission in a CA environment. In other words, cells to which logical channels may send data need to be restricted. According to an embodiment of the disclosure, as illustrated in FIG. 2A, the PDCP entity 2a-10 may send packets to the RLC1 2a-20 and the RLC2 2a-30, which may use one or more of a primary cell (PCell) 2a-60, a secondary cell (SCell) 1 2a-70, a SCell 2 2a-80, a SCell 3 2a-90, a SCell 4 2a-100, and a SCell 5 2a-110 to transmit packets. When packet duplication is activated, a logical channel 1 2a-40 may send data to the SCell 1 2a-70 and the SCell 2 2a-80, and a logical channel 2 2a-50 may send data to the SCell 3 2a-90 and the SCell 4 2a-100. Herein, a cell may also be called a component carrier (CC).

Based on packet duplication, the same packet is transmitted using two or more RLC entities and thus radio resource consumption may be increased. Performing of packet duplication all the time may cause inefficient use of radio resources and thus is not appropriate. Therefore, packet duplication may be controlled to be performed only when necessary. Controlling of packet duplication to be performed in a radio bearer for which packet duplication is configured is called activation of packet duplication. On the contrary, controlling of packet duplication not to be performed in a radio bearer for which packet duplication is configured is called deactivation of packet duplication. Activation and deactivation of packet duplication may be directed by a base station (also referred to as a next-generation NodeB (gNB)) and be performed by a UE. Alternatively, activation and deactivation of packet duplication may be performed based on a preset condition of the UE.

When packet duplication is deactivated, cells to which a logical channel corresponding to each RLC entity may send data may not need to be restricted. As shown in FIG. 2A, a PDCP entity 2a-15 may send packets to an RLC1 2a-25 and an RLC2 2a-35, which may use one or more of a PCell 2a-65, a SCell 1 2a-75, a SCell 2 2a-85, a SCell 3 2a-95, a SCell 4 2a-105, and a SCell 5 2a-115 to transmit packets. Therefore, when packet duplication is deactivated, a logical channel 1 2a-45 and a logical channel 2 2a-55 may use all of the PCell 2a-65, the SCell 1 2a-75, the SCell 2 2a-85, the SCell 3 2a-95, the SCell 4 2a-105, and the SCell 5 2a-115 to transmit packets. That is, packets may be transmitted to all activated cells. However, when packet duplication is deactivated, the PDCP entity 2a-15 does not send a packet to the secondary RLC entity 2a-35 and thus the secondary RLC entity 2a-35 may not transmit much data.

FIG. 2B is a schematic diagram for describing a procedure in a case in which an RLC maximum retransmission threshold is reached in an environment in which packet duplication is configured. The procedure is performed in an RLC acknowledged mode (AM) and, when a negative acknowledgement (NACK) message is received in response to an initially transmitted packet, a UE sets a RETX_COUNT to be 0 and performs retransmission. Thereafter, the RETX_COUNT is increased by 1 whenever a NACK message is received in response to the same packet and, when a preset maximum retransmission threshold maxRetxThreshold is reached, the UE may notify a gNB of the event. When an RLC entity having reached the maximum retransmission threshold may not use a PCell or a primary secondary cell (PSCell) and may use only SCells like RLC1 2a-20 or RLC2 2a-30 of FIG. 2A, the UE may simply notify the gNB that the maximum retransmission threshold is reached 2b-100. In this case, to notify the RLC entity having an error, the UE transmits a logical channel identifier (LCID) and cell group information of the RLC entity to the gNB. Thereafter, the gNB may, for example, reset the RLC entity or reconfigure a radio bearer to solve the error. When cells usable by the logical channel are not restricted or the logical channel may use a PCell or a PSCell, the UE performs a radio link failure (RLF) procedure.

Although the RLC entity having reached the maximum retransmission threshold may not use a PCell or a PSCell and may use only SCells like RLC1 2a-20 or RLC2 2a-30 of FIG. 2A, when packet duplication is deactivated, the RLC entity may transmit a packet by using a PCell or a PSCell. Activation or deactivation of packet duplication may be flexibly switched based on an indication of the gNB or a preset condition. The embodiment of the disclosure illustrated in FIG. 2B assumes that packet duplication is deactivated 2b-10 until second retransmission 2b-32 and is activated 2b-15 after the second retransmission 2b-32. In this case, initial transmission 2b-30, first retransmission 2b-31, second retransmission 2b-32, third retransmission 2b-33, and fourth retransmission 2b-34 may be performed to a PCell or a PSCell. At this time, when only the LCID and the cell group information of the RLC entity having reached the maximum retransmission threshold 2b-50 are transmitted 2b-100 from the UE 2b-25 to the gNB 2b-20, the gNB 2b-20 may not accurately determine the error.

Figure 2C:
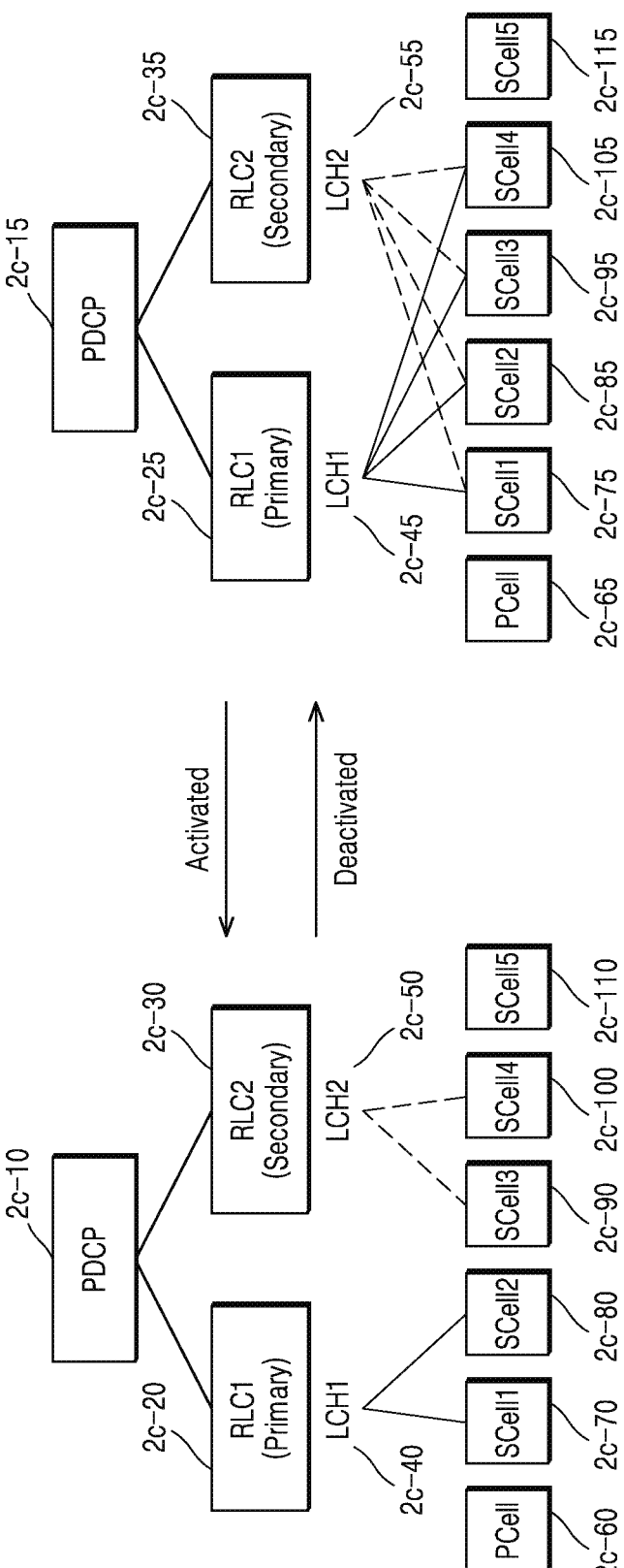
FIG. 2C is a schematic diagram for describing a cell switching procedure in a case in which packet duplication transmission is deactivated according to an embodiment of the disclosure.

FIG. 2C is a schematic diagram for describing a cell switching procedure in a case in which packet duplication is deactivated, according to an embodiment of the disclosure. As illustrated in FIG. 2C, a PDCP entity 2c-10 may send packets to an RLC1 2c-20 and an RLC2 2c-30, which may use one or more of a PCell 2c-60, a SCell 1 2c-70, a SCell 2 2c-80, a SCell 3 2c-90, a SCell 4 2c-100, and a SCell 5 2c-110 to transmit packets. A list of cells usable by each logical channel when packet duplication is activated is the same as that of FIG. 2A. In other words, a logical channel 1 2c-40 may use the SCell 1 2c-70 and the SCell 2 2c-80, and a logical channel 2 2c-50 may use the SCell 3 2c-90 and the SCell 4 2c-100.

When packet duplication of a corresponding radio bearer is deactivated, cells usable by each logical channel may be increased. As shown in FIG. 2C, a PDCP entity 2c-15 may send packets to an RLC1 2c-25 and an RLC2 2c-35, which may use one or more of a PCell 2c-65, a SCell 1 2c-75, a SCell 2 2c-85, a SCell 3 2c-95, a SCell 4 2c-105, and a SCell 5 2c-115 to transmit packets. According to the embodiment of the disclosure illustrated in FIG. 2C, when packet duplication is deactivated, each logical channel of the radio bearer may use all cells usable by logical channels connected to the radio bearer. That is, each of a logical channel 1 2c-45 and a logical channel 2 2c-35 may use all of the SCell 1 2c-75, the SCell 2 2c-85, the SCell 3 2c-95, and the SCell 4 2c-105 usable by the logical channels. However, the PCell 2c-65 and the SCell 5 2c-115 unusable by the logical channel 1 2c-45 or the logical channel 2 2c-55 may not be used even when packet duplication is deactivated. According to the embodiment of the disclosure illustrated in FIG. 2C, a PDCP layer of a transmitter may send a packet to a primary RLC entity regardless of whether packet duplication is activated. The PDCP layer of the transmitter may send a packet to a secondary RLC entity only when packet duplication is activated.

Figure 2D:
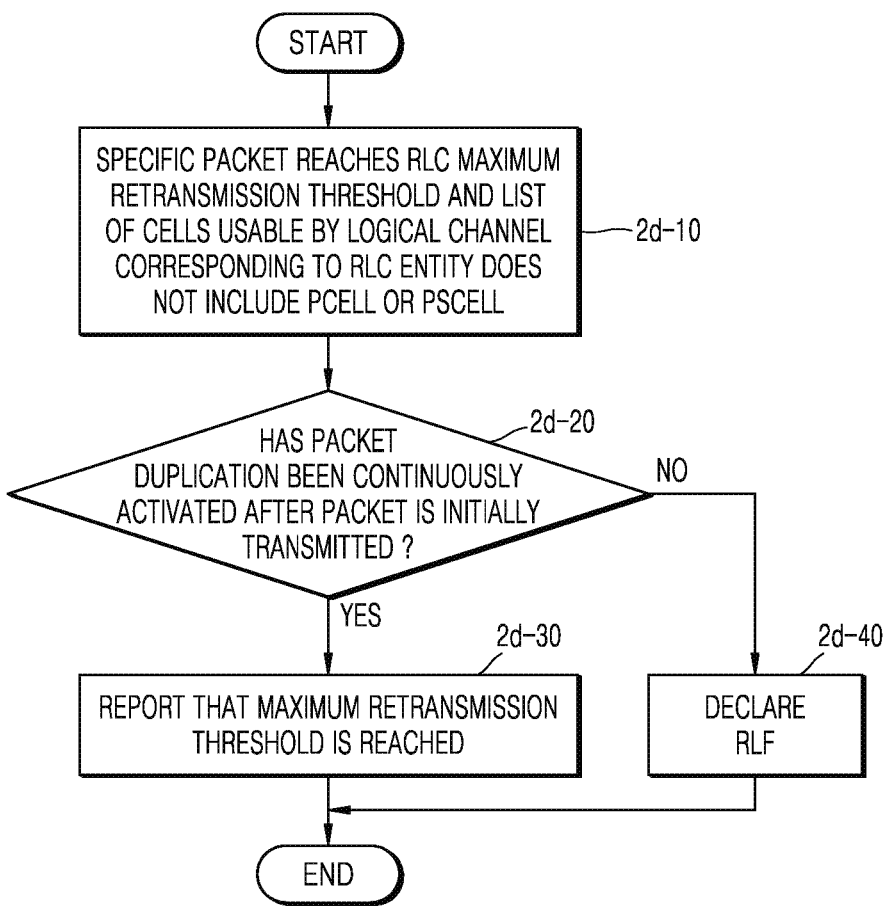
FIG. 2D is a flowchart of a UE procedure in a case in which a maximum retransmission threshold is reached, according to an embodiment of the disclosure.

FIG. 2D is a flowchart of a UE procedure in a case in which a specific packet reaches an RLC maximum retransmission threshold, according to an embodiment of the disclosure. When the specific packet reaches the RLC maximum retransmission threshold and a list of cells usable by a logical channel corresponding to an RLC entity does not include a PCell or a PSCell in operation 2d-10, a UE may perform a RLF procedure of a master cell group (MCG) or a secondary cell group (SCG) in operation 2d-40 or simply notify a gNB that the maximum retransmission threshold is reached in operation 2d-30 or 2b-100 of FIG. 2B, based on whether packet duplication has been continuously activated after the packet is initially transmitted in operation 2d-20. In this regard, the UE may compare an initial transmission timing of every packet (e.g., an RLC PDU) and the latest packet duplication activation timing. When packet duplication has been continuously activated up to now after the packet having reached the maximum retransmission threshold is initially transmitted, the UE may notify the gNB that the maximum retransmission threshold is reached in operation 2d-30. The RLC entity of the UE may inform a radio resource control (RRC) entity of the UE, and the RRC entity of the UE may report to the gNB. In this case, the RRC entity of the UE may provide a report indicating the RLC entity having an error, to the gNB, and the report provided to the gNB may include an LCID and cell group information. When packet duplication has been deactivated after the packet having reached the maximum retransmission threshold is initially transmitted, the UE may perform the RLF procedure of the MCG or the SCG in operation 2d-40.

Figure 2E:
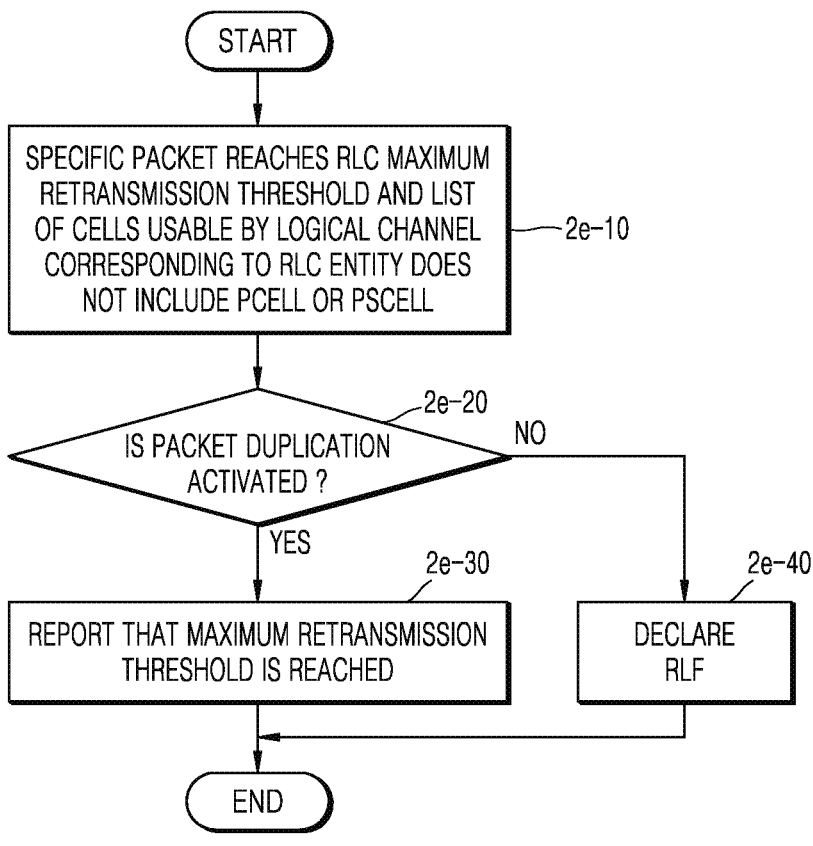
FIG. 2E is a flowchart of a UE procedure in a case in which a maximum retransmission threshold is reached, according to an embodiment of the disclosure.

FIG. 2E is a flowchart of a UE procedure in a case in which a specific packet reaches an RLC maximum retransmission threshold, according to another embodiment of the disclosure. When the specific packet reaches the RLC maximum retransmission threshold and a list of cells usable by a logical channel corresponding to an RLC entity does not include a PCell or a PSCell in operation 2e-10, a UE may perform a RLF procedure of a MCG or a SCG in operation 2e-40 or simply notify a gNB that the maximum retransmission threshold is reached in operation 2e-30 or 2b-100 of FIG. 2B, based on whether packet duplication is activated at a timing at which the maximum retransmission threshold is reached in operation 2e-20. According to an embodiment of the disclosure, the UE does not need to check an initial transmission timing of every packet (e.g., an RLC PDU) and may merely determine whether packet duplication is activated at the timing at which the maximum retransmission threshold is reached. When packet duplication is activated at the timing at which the maximum retransmission threshold is reached, the UE may notify the gNB that the maximum retransmission threshold is reached in operation 2e-30. The RLC entity of the UE may inform a RRC entity of the UE, and the RRC entity of the UE may report to the gNB. The RRC entity of the UE may provide a report indicating the RLC entity having an error, to the gNB, and the report provided to the gNB may include an LCID and cell group information. When packet duplication is deactivated at the timing at which the maximum retransmission threshold is reached, the UE may perform the RLF procedure of the MCG or the SCG in operation 2e-40.

Figure 2F:
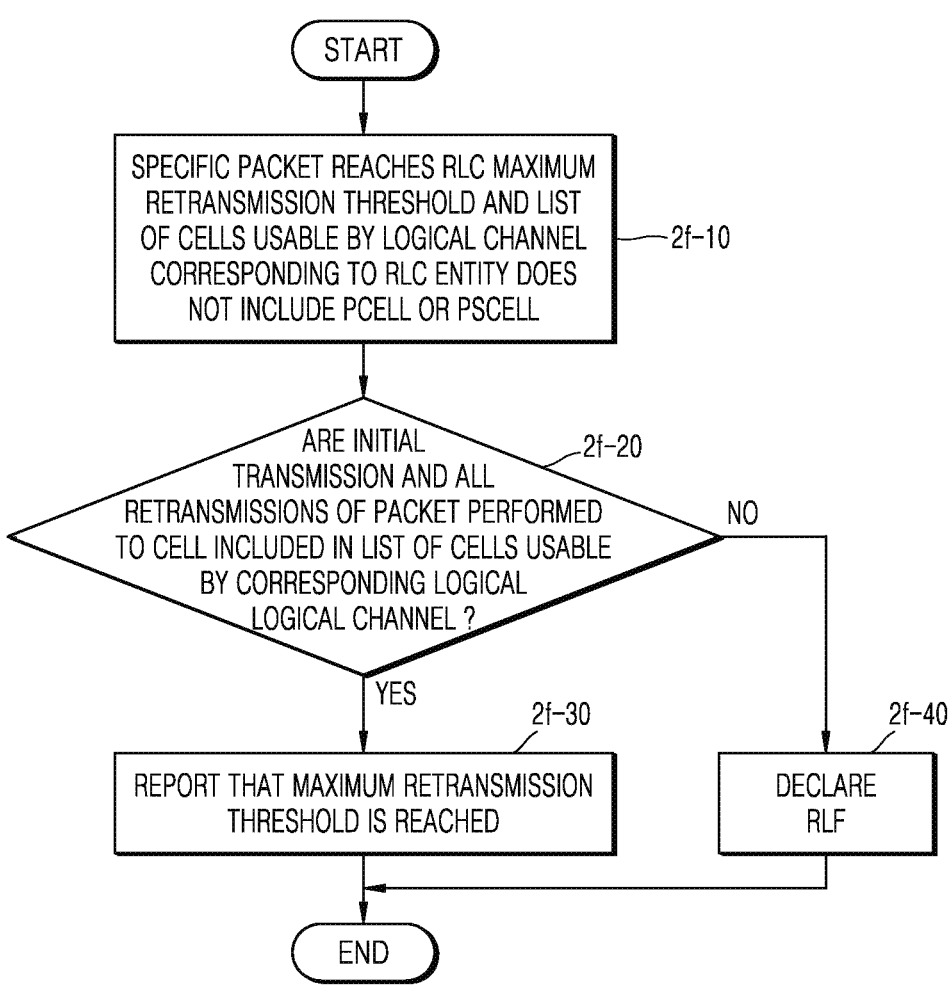
FIG. 2F is a flowchart of a UE procedure in a case in which a maximum retransmission threshold is reached, according to an embodiment of the disclosure.

FIG. 2F is a flowchart of a UE procedure in a case in which a specific packet reaches an RLC maximum retransmission threshold, according to another embodiment of the disclosure. When the specific packet reaches the RLC maximum retransmission threshold and a list of cells usable by a logical channel corresponding to an RLC entity does not include a PCell or a PSCell in operation 2f-10, a UE may perform a RLF procedure of a MCG or a SCG in operation 2f-40 or simply notify a gNB that the maximum retransmission threshold is reached in operation 2f-30 or 2b-100 of FIG. 2B, based on whether initial transmission and all retransmissions of the packet having reached the maximum retransmission threshold are performed to a cell included in a list of cells usable by a corresponding logical channel in operation 2f-20. In this regard, the UE needs to record cells to which initial transmission and retransmissions of every packet (e.g., an RLC PDU) are performed, and may compare the cells at a timing at which the maximum retransmission threshold is reached. When the initial transmission and all the retransmissions of the packet having reached the maximum retransmission threshold are performed to a cell included in the list of cells usable by the logical channel, the UE may notify the gNB that the maximum retransmission threshold is reached in operation 2f-30. The RLC entity of the UE may inform a RRC entity of the UE, and the RRC entity of the UE may report to the gNB. In this case, the RRC entity of the UE may provide a report indicating the RLC entity having an error, to the gNB, and the report provided to the gNB may include an LCID and cell group information. When at least one of the initial transmission or all the retransmissions of the packet having reached the maximum retransmission threshold is performed to a cell not included in the list of cells usable by the logical channel, the UE may perform the RLF procedure of the MCG or the SCG in operation 2f-40.

In another embodiment of the disclosure, the UE may perform the RLF procedure or simply notify the gNB, based on whether the initial transmission and all the retransmissions of the packet having reached the maximum retransmission threshold are performed to a SCell. In this case, when the initial transmission and all the retransmissions of the packet having reached the maximum retransmission threshold are performed to a SCell, the UE may report the maximum retransmission threshold. Otherwise, the UE may perform the RLF procedure of the MCG or the SCG. In operation 2f-20, it may be additionally considered whether packet duplication is activated at the timing.

FIG. 2G is a flowchart of a UE procedure in a case in which a specific packet reaches an RLC maximum retransmission threshold, according to another embodiment of the disclosure. When the specific packet reaches the RLC maximum retransmission threshold and a list of cells usable by a logical channel corresponding to an RLC entity does not include a PCell or a PSCell in operation 2g-10, a UE may perform a RLF procedure of a MCG or a SCG in operation 2g-40 or simply notify a gNB that the maximum retransmission threshold is reached in operation 2g-30 or 2b-100 of FIG. 2B, based on whether initial transmission and all retransmissions of the packet having reached the maximum retransmission threshold are performed while packet duplication is being activated in operation 2g-20. In this regard, the UE needs to record activation statuses of packet duplication when initial transmission and retransmissions of every packet (e.g., an RLC PDU) are performed, and may compare the activation statuses at a timing at which the maximum retransmission threshold is reached. When the initial transmission and all the retransmissions of the packet having reached the maximum retransmission threshold are performed while packet duplication is being activated, the UE may notify the gNB that the maximum retransmission threshold is reached in operation 2g-30. The RLC entity of the UE may inform a RRC entity of the UE, and the RRC entity of the UE may report to the gNB. In this case, the RRC entity of the UE may provide a report indicating the RLC entity having an error, to the gNB, and the report provided to the gNB may include an LCID and cell group information. When at least one of the initial transmission or all the retransmissions of the packet having reached the maximum retransmission threshold is performed while packet duplication is being deactivated, the UE may perform the RLF procedure of the MCG or the SCG in operation 2g-40. In operation 2g-20, it may be additionally considered whether packet duplication is activated at the timing.

Figure 2H:
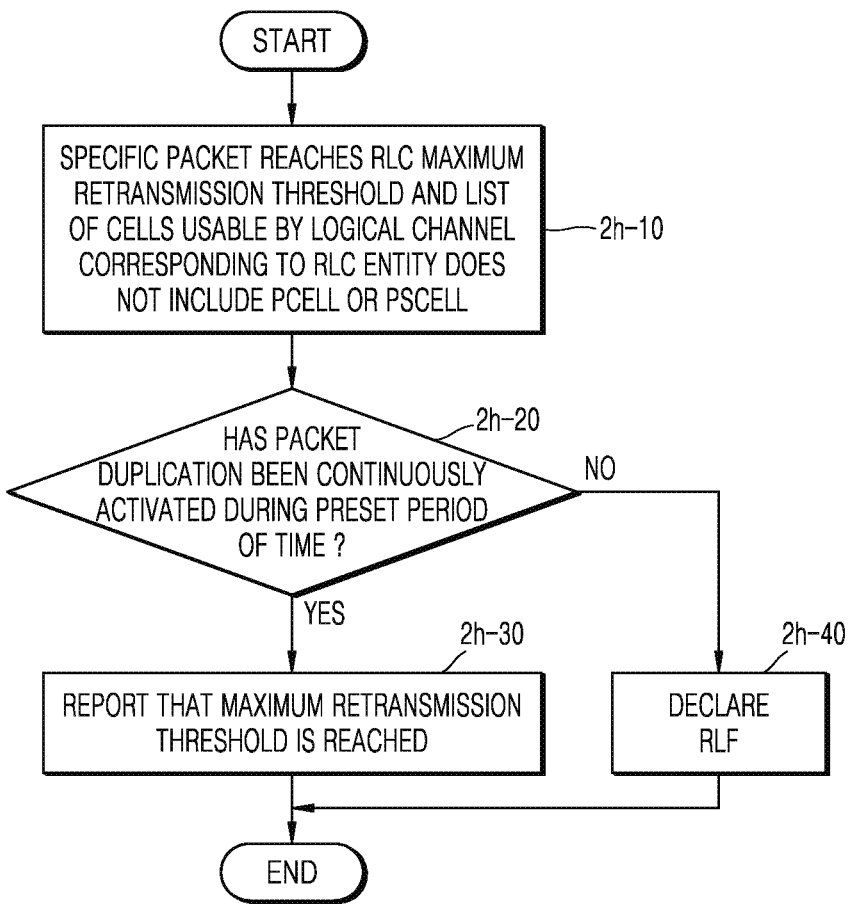
FIG. 2H is a flowchart of a UE procedure in a case in which a maximum retransmission threshold is reached, according to an embodiment of the disclosure.

FIG. 2H is a flowchart of a UE procedure in a case in which a specific packet reaches an RLC maximum retransmission threshold, according to another embodiment of the disclosure. When the specific packet reaches the RLC maximum retransmission threshold and a list of cells usable by a logical channel corresponding to an RLC entity does not include a PCell or a PSCell in operation 2h-10, a UE may perform a RLF procedure of a MCG or a SCG in operation 2h-40 or simply notify a gNB that the maximum retransmission threshold is reached in operation 2h-30 or 2b-100 of FIG. 2B, based on whether packet duplication has been continuously activated during a preset period of time until a timing at which the maximum retransmission threshold is reached in operation 2h-20. For example, when the preset period of time is 1 sec., the UE may determine whether packet duplication has been continuously activated within, for example, the last 1 sec. before the timing at which the maximum retransmission threshold is reached. In this regard, the UE may record the latest packet duplication activation timing of every packet (e.g., an RLC PDU) and compare the same with the timing at which the maximum retransmission threshold is reached. When packet duplication has been continuously activated during the latest preset period of time until the timing at which the maximum retransmission threshold is reached, the UE may notify the gNB that the maximum retransmission threshold is reached in operation 2h-30. The RLC entity of the UE may inform a RRC entity of the UE, and the RRC entity of the UE may report to the gNB. In this case, the RRC entity of the UE may provide a report indicating the RLC entity having an error, to the gNB, and the report provided to the gNB may include an LCID and cell group information. When packet duplication has been deactivated during the preset period of time until the timing at which the maximum retransmission threshold is reached, the UE may perform the RLF procedure of the MCG or the SCG in operation 2h-40.

According to an embodiment of the disclosure, criteria used when the UE determines whether to perform a RLF operation or to simply notify a gNB that a maximum retransmission threshold is reached are not limited to the examples described above in relation to FIGS. 2D to 2H. The UE may determine whether to perform the RLF operation or to simply notify the gNB that the maximum retransmission threshold is reached, by simultaneously or sequentially applying two or more of the embodiments of the disclosure described above in relation to FIGS. 2D to 2H.

Figure 2I:
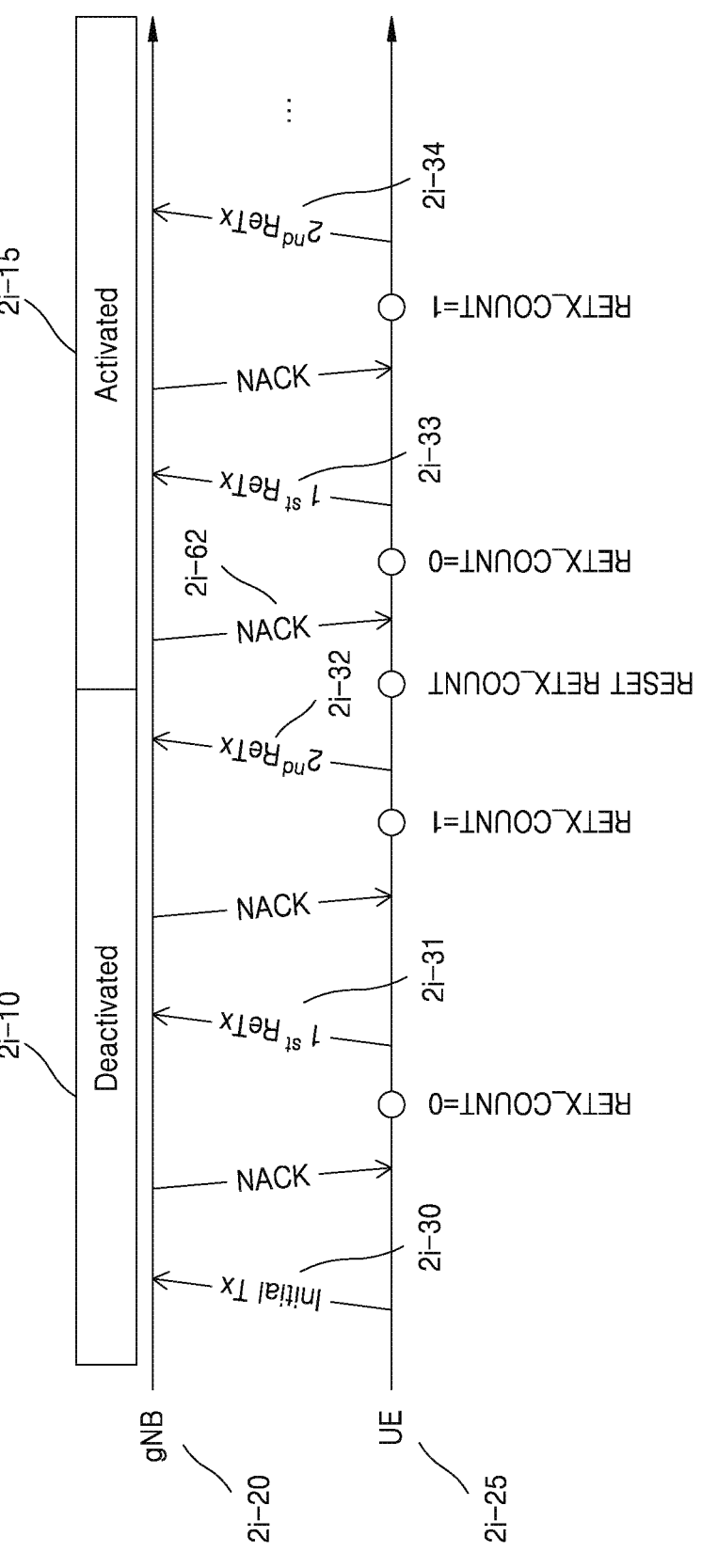
FIG. 2I is a schematic diagram for describing a procedure of resetting a retransmission count at a timing at which packet duplication is activated according to an embodiment of the disclosure.

FIG. 2I is a schematic diagram for describing a procedure, performed by a UE, of updating a retransmission count, according to an embodiment of the disclosure. According to the embodiment of the disclosure illustrated in FIG. 2B, when a NACK message corresponding to an initially transmitted packet is received, a UE may reset a retransmission count RETX_COUNT. Whenever a NACK message is received after retransmission, the UE may increase the RETX_COUNT by 1. However, according to the previous embodiment of the disclosure, a packet may be transmitted to a cell other than cells usable by a logical channel while packet duplication is being deactivated, which may not be considered for a maximum retransmission threshold.

Therefore, as illustrated in FIG. 2I, according to an embodiment of the disclosure, the UE 2i-25 may reset the RETX_COUNT 2i-40 at a timing at which packet duplication is activated. According to an embodiment of the disclosure, it is assumed that initial transmission 2i-30 and first retransmission 2i-31 to gNB 2i-20 fail and second retransmission 2i-32 is performed while packet duplication is deactivated 2i-10, and then packet duplication is activated 2i-15. As packet duplication is activated, the UE 2i-25 may reset the RETX_COUNT. Thereafter, a NACK message is received in response to the second retransmission 2i-62. In this case, the UE 2i-25 may regard the NACK message as failure of initial transmission of the packet and update the RETX_COUNT to 0. When a maximum retransmission threshold is reached thereafter, because all transmissions of the packet are performed while packet duplication is being activated, the UE 2i-25 may not declare RLF and may report to the gNB 2i-20 that the maximum retransmission threshold is reached.

According to another embodiment of the disclosure, after the RETX_COUNT is reset, the UE may ignore previous retransmissions and perform initial transmission again.

According to another embodiment of the disclosure, after the RETX_COUNT is reset, retransmission may be regarded as first transmission 2i-33. When a NACK message is received in response to the first transmission, the UE 2i-25 may regard the NACK message as failure of the first transmission and may perform a second transmission 2i-34.

Figure 3:
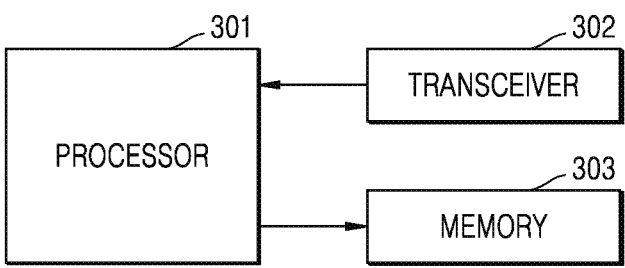
FIG. 3 is a block diagram of a UE according to an embodiment of the disclosure.

FIG. 3 is a block diagram of a UE according to an embodiment of the disclosure.

Referring to FIG. 3, the UE may include a processor 301, a transceiver 302, and a memory 303. Herein, the processor 301 may be defined as a circuit- or ASIC or at least one processor.

The processor 301 illustrated in FIG. 3 may correspond to the controller 330 described above in relation to FIG. 1C, the transceiver 302 illustrated in FIG. 3 may correspond to the communicator 310 described above in relation to FIG. 1C, and the memory 303 illustrated in FIG. 3 may correspond to the storage 320 described above in relation to FIG. 1C.

The processor 301 according to an embodiment of the disclosure may control overall operations of the UE. For example, the processor 301 may control the flow of signals between blocks to perform the operations described above in the previous embodiments of the disclosure.

The transceiver 302 according to an embodiment of the disclosure may transmit and receive signals to and from other network entities. For example, the transceiver 302 may receive system information and a synchronization signal or a reference signal from a base station.

The memory 303 according to an embodiment of the disclosure may store at least one of information to be transmitted or received through the transceiver 302 or information generated by the processor 301.

The processor 301 according to an embodiment of the disclosure may perform a series of operations described above in relation to FIG. H.

The processor 301 according to an embodiment of the disclosure may configure a reference signal for the UE in consideration of different frequency bands, and perform cell measurement and reporting by using the configured reference signal.

The processor 301 according to another embodiment of the disclosure may perform a series of operations described above in relation to FIGS. 2D to 2H. When a specific packet reaches an RLC maximum retransmission threshold and a list of cells usable by a logical channel corresponding to an RLC entity does not include a PCell or a PSCell, the processor 301 according to another embodiment of the disclosure may determine whether to perform a RLF procedure of a MCG or a SCG or to simply notify a base station that the maximum retransmission threshold is reached, for the UE based on whether the packet has been transmitted to a cell included in a list of cells usable by the logical channel, or information about activation of packet duplication.

That is, the processor 301 may control the other elements of the UE to implement all of the previous embodiments of the disclosure.

Figure 4:
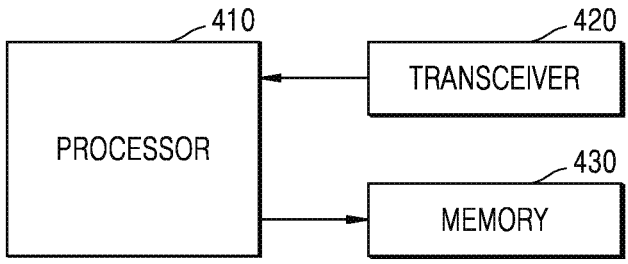
FIG. 4 is a block diagram of a base station according to an embodiment of the disclosure.

FIG. 4 is a block diagram of a base station according to an embodiment of the disclosure.

Referring to FIG. 4, the base station may include a processor 410, a transceiver 420, and a memory 430.

The processor 410 illustrated in FIG. 4 may correspond to the controller 240 described above in relation to FIG. 1B, the transceiver 420 illustrated in FIG. 4 may correspond to the wireless communicator 210 described above in relation to FIG. 1B, and the memory 430 illustrated in FIG. 4 may correspond to the storage 230 described above in relation to FIG. 1B.

Herein, the processor 410 may be defined as a circuit- or application-specific IC or at least one processor.

The processor 410 according to an embodiment of the disclosure may control overall operations of the base station according to an embodiment of the disclosure. For example, the processor 410 may control the flow of signals between blocks to perform the operations described above in the previous embodiments of the disclosure.

The transceiver 420 according to an embodiment of the disclosure may transmit and receive signals to and from other network entities. For example, the transceiver 420 may transmit system information and a synchronization signal or a reference signal to a UE.

The memory 430 may store at least one of information to be transmitted or received through the transceiver 420 or information generated by the processor 410.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-transitory non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description and the disclosure is not limited to the singular or plural form. An element expressed in a singular form may include a plurality of elements, and elements expressed in a plural form may include a single element.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:

identifying whether a maximum number of retransmissions associated with a radio link control (RLC) is reached;

identifying whether a packet duplication is activated; and transmitting, to a base station, a message related to the RLC, in case that the maximum number of retransmissions associated with the RLC is reached, the packet duplication is activated, and at least one allowed cell for a logical channel associated with the RLC includes at least one secondary cell (SCell); only, wherein the message related to the RLC includes information about an identity (ID) of the logical channel associated with the RLC and information about a cell group associated with the RLC, and wherein a radio link failure for the cell group associated with the RLC is identified, in case that the maximum number of retransmissions is reached and the packet duplication is deactivated.

2. The method of claim 1, wherein the cell group associated with the RLC includes at least one of a master cell group (MCG) or a secondary cell group (SCG).

3. The method of claim 1, wherein the identifying of whether the packet duplication is activated comprises:

identifying whether the packet duplication has been activated continuously since a packet was initially transmitted until a time at which the maximum number of retransmissions of the packet is reached.

4. The method of claim 1, wherein the identifying of whether the packet duplication is activated comprises:

identifying whether the packet duplication is activated at a time at which the maximum number of retransmissions of a packet is reached.

5. The method of claim 1, wherein the identifying of whether the packet duplication is activated comprises:

identifying whether the packet duplication has been activated continuously during a preset time until a time at which the maximum number of retransmissions of a packet is reached.

6. A terminal in a wireless communication system, the terminal comprising:

a transceiver; and at least one processor coupled with the transceiver and configured to:

identify whether a maximum number of retransmissions associated with a radio link control (RLC) is reached, identify whether a packet duplication is activated, and control the transceiver to transmit, to a base station, a message related to the RLC, in case that the maximum number of retransmissions associated with the RLC is reached, the packet duplication is activated, and at least one allowed cell for a logical channel associated with the RLC includes at least one secondary cell (SCell) only, wherein the message related to the RLC includes information about an identity (ID) of the logical channel associated with the RLC and information about a cell group associated with the RLC, and wherein a radio link failure for the cell group associated with the RLC is identified, in case that the maximum number of retransmissions is reached and the packet duplication is deactivated.

7. The terminal of claim 6, wherein the cell group associated with the RLC includes at least one of a master cell group (MCG) or a secondary cell group (SCG).

8. The terminal of claim 6, wherein the at least one processor is further configured to:

identify whether the packet duplication has been activated continuously since a packet was initially transmitted until a time at which the maximum number of retransmissions of the packet is reached.

9. The terminal of claim 6, wherein the at least one processor is further configured to:

identify whether the packet duplication is activated at a time at which the maximum number of retransmissions of a packet is reached.

10. The terminal of claim 6, wherein the at least one processor is further configured to:

identify whether the packet duplication has been activated continuously during a preset time until a time at which the maximum number of retransmissions of a packet is reached.

11. A computer program product comprising a non-transitory computer-readable recording medium having recorded thereon a computer-readable program to be executed on a computing device to cause the computing device to:

identify whether a maximum number of retransmissions associated with a radio link control (RLC) is reached, identify whether a packet duplication is activated, and transmit, to a base station, a message related to the RLC, in case that the maximum number of retransmissions associated with the RLC is reached, the packet duplication is activated, and at least one allowed cell for a logical channel associated with the RLC includes at least one secondary cell (SCell) only, wherein the message related to the RLC includes information about an identity (ID) of the logical channel associated with the RLC and information about a cell group associated with the RLC, and wherein a radio link failure for the cell group associated with the RLC is identified, in case that the maximum number of retransmissions is reached and the packet duplication is deactivated.

\* \* \* \* \*